United States Patent [19]
Hartsing, Jr. et al.

[11] Patent Number: 4,737,389
[45] Date of Patent: * Apr. 12, 1988

[54] DUAL OVENABLE FROZEN FOOD TRAY/COOKWARE FORMED FROM A LAINATE CONTAINING A POLYMER THAT IS CRYSTALLIZABLE AT USE TEMPERATURE

[75] Inventors: Tyler F. Hartsing, Jr., Westfield; Marvin E. Sauers, Belle Meade, both of N.J.

[73] Assignee: Amoco Corporation, Chicago, Ill.

[ * ] Notice: The portion of the term of this patent subsequent to Mar. 18, 2003 has been disclaimed.

[21] Appl. No.: 824,865

[22] Filed: Jan. 31, 1986

[51] Int. Cl.$^4$ .................. B65D 23/00; B32B 27/36
[52] U.S. Cl. .................................. 428/35; 428/412; 428/419; 428/473.5; 428/475.2; 428/483; 428/457; 428/537.5; 428/520; 428/413; 428/325; 206/484; 206/524.2; 426/127; 264/176.1

[58] Field of Search .............. 428/35, 412, 483, 473.5, 428/475.2, 419

[56] References Cited
U.S. PATENT DOCUMENTS

| | | | |
|---|---|---|---|
| 4,079,850 | 3/1978 | Suzuki et al. | 428/483 X |
| 4,286,015 | 8/1981 | Yoshida et al. | 428/419 |
| 4,507,338 | 3/1985 | Freundlich | 428/35 |
| 4,572,852 | 2/1986 | Gartland et al. | 428/480 |

Primary Examiner—P. C. Ives
Attorney, Agent, or Firm—Donald M. Papuga; William H. Magidson; Ralph C. Medhurst

[57] ABSTRACT

Described herein is a frozen food tray/cookware formed from a laminate, said laminate comprising at least three sheets made from a thermoplastic resin, wherein the inside sheet is made from an amorphous thermoplastic resin having a lower use temperature than the outside sheets, said amorphous thermoplastic resin being at least partially crystallizable at said lower use temperature.

55 Claims, No Drawings

DUAL OVENABLE FROZEN FOOD TRAY/COOKWARE FORMED FROM A LAINATE CONTAINING A POLYMER THAT IS CRYSTALLIZABLE AT USE TEMPERATURE

FIELD OF THE INVENTION

This invention relates to frozen food tray/cookware formed from a laminate, said laminate comprising at least three sheets made from a thermoplastic resin, wherein the inside sheet is made from an amorphous thermoplastic resin. The amorphous thermoplastic resin has a lower use temperature than the thermoplastic resin that the two outside sheets are made from, and the amorphous thermoplastic resin is at least partially crystallizable at said lower use temperature. Additionally, this invention relates to a laminate suitable for molding into the above-described frozen food tray/cookware.

BACKGROUND OF THE INVENTION

Frozen food tray/cookware utilized in conventional ovens should have the capability of withstanding the great temperature variations existing between the temperature setting devices and the actual temperatures within the oven. Though the frozen food tray/cookware is only exposed to the oven's actual temperature, the user's expectations of the frozen food tray/cookware's capacity to withstand heat is a critical factor in the use of that frozen food tray/cookware. Putting frozen food tray/cookware that deforms at e.g. 200° F. into an oven set for 325° F. is clearly illogical. Equally illogical would be the use of the same frozen food tray/cookware in an oven whose temperature setting device fails to accurately control the oven's temperature. Thus a low temperature setting could result in a high oven temperature, and the frozen food tray/cookware would still deform. The realities of life are that few commercially available gas and electric ovens have accurate temperature controls and in most cases the ovens run hotter than the temperature setting. In a number of cases, an oven temperature setting of 400° F. resulted in an oven temperature as high as 475°–500° F. This is the basis for the first sentence of this paragraph.

Plastics are typically termed thermoplastic or thermosetting. Thermoplastics are deformable with application of sufficient heat. Because thermosetting plastics (resins) are crosslinked, they are fairly resistant to heat deformation, certainly more so than thermoplastics. Consequently, thermosetting resins have been extensively used for the fabrication of cookware. For example, cookware has been made from melamine-formaldehyde resins, unsaturated polyester resins, and the like. Such plastics have excellent heat resistance. However, they do suffer from a number of significant deficiencies. Because they crosslink during their curing processes when molded, they shrink and pull away from the mold surfaces. Unless they are properly filled with small particulate fillers, the molded objects have very uneven surfaces, and they are subject to significant crazing and/or cracking. High filler loading adversely affects the physical properties of the molded object and precludes the direct obtaining of a glossy surface. Thermosetting resins are difficult to mold. They generally have to be compression or transfer molded. Such processes require much materials handling, large equipment, complicated and relatively expensive molds, and significant energy costs.

Thermoplastics have been used for coating paper dishware and some of them have been used as cookware. However, their use as cookware is severely restricted, generally to microwave oven applications. Thermoplastics, such as Udel ™ polysulfone (made by Union Carbide Corporation), have been sold for use in making cookware designed for microwave oven applications. One would expect that some of such cookware has been generally employed in conventional ovens as well. However, Udel ™ polysulfone has not proven to be suitable for the wide temperatures used in conventional oven cooking and hence, its usage in such applications has not been recommended.

Thermoformed crystallized polyethylene terephthalate (hereinafter "PET") is used for cookware in microwave and conventional oven units, but is generally limited in use to about 350° F. Above this temperature, the modulus of the material drops rapidly so that cookware will sag and distort and will be unstable from a handling standpoint when removing from the oven with a food load present in the container. In the 400° F. range, the polyethylene terephthalate containers will distort severely and lose their shape. If the PET is not crystallized during production of the cookware, it will only withstand a temperature of about 180° F. before melting and, hence, is not at all suitable for conventional oven use.

Though the physical properties of a thermoplastic might,be considered at first blush to be the basis for its use as generally employable frozen food tray/cookware, i.e., frozen food tray/cookware usable in any kind of oven up to a temperature of 500° F., such is clearly not the case. Since frozen food tray/cookware is in contact with the food placed therein, the plastic it is made from must be safe to use and not contaminate the food it contacts. Temperature gradients exist within conventional ovens and such a variable requires actual working information about a plastic's performance as frozen food tray/cookware under a wide variety of conditions.

In order to function as a frozen food tray as well as cookware, the plastic's performance must also be good at low temperature. For example, frozen food is commonly subjected to rough handling at temperatures as low as minus 40° F. Since many plastics become brittle at these low temperatures, impact strength to withstand rough handling must be assured. As an illustrative example, the thermoformed crystallized PET discussed above is quite brittle at these low temperatures, and hence provides only marginally acceptable performance as a frozen food tray item.

Currently, frozen food trays are largely fabricated of aluminum or cardboard. An aluminum tray, although excellent for use in conventional ovens, cannot be microwaved without causing arcing in the microwave oven. In contrast, a cardboard tray can be microwaved but cannot withstand the high temperature of conventional ovens.

In view of the above, it would be highly desirable to provide a plastic frozen food tray/cookware characterized by impact resistance at low temperatures of about minus 40° F., as well as the ability to withstand both microwave and conventional oven conditions with a minimum of sagging or distortion.

SUMMARY OF THE INVENTION

The present invention relates to frozen food tray/cookware made from a laminate said laminate comprising at least three sheets made from a thermoplastic resin, including an inside sheet and at least two outside sheets. The outside sheets are made from a thermoplastic resin selected from the group consisting of a polyarylethersulfone, a poly(aryl ether), polyarylate, polyetherimide, polyester, aromatic polycarbonate, styrene resin, poly(alkyl acrylate), polyhydroxyether, polyamide and poly(arylene sulfide). The inside (or innermost) sheet is made from an amorphous thermoplastic resin having a lower use temperature than the outside sheets. The amorphous thermoplastic resin is at least partially crystallizable at said lower use temperature but is preferably no more than about 5% crystallized at this lower use temperature.

Frozen food tray/cookware made from the laminate of this invention meets the key requirements needed for cookware molded from plastic materials described above, as well as the key requirements needed for frozen food trays molded from plastic materials also described above. The frozen food tray/cookware of this invention is suitable for use in conventional as well as microwave ovens.

DETAILED DESCRIPTION OF THE INVENTION

An important aspect of the laminates of the present invention pertains to the crystallizable nature of the innermost layer of the laminate at the oven use temperature of the frozen food tray/cookware made from the laminate. In this regard, a polyester innermost laminate layer has been found to be particularly suitable since a rapid quench of this material after extrusion into the laminate and thermoforming of the laminate will avoid crystallization from extrusion and yet allow crystallization to take place in the oven during use of the frozen food tray/cookware at about 350° F. By maintaining the inner laminate layer of the frozen food tray/cookware in an amorphous state prior to oven use, superior impact resistance has been unexpectedly found. In addition, the in situ crystallization of the innermost laminate layer during oven use has now unexpectedly been found to increase the strength and shape retention of the tray.

It is particularly noted that the tray handle and/or upper rim area are expected to become least partially crystallized during conventional oven use, and the resulting improved flexural modulus is expected to facilitate handling of the tray. It is further noted that the food in the frozen food tray/cookware is expected to act as a heat sink, thereby retarding the crystallization of the tray portions covered by food.

The various thermoplastic polymers useful in fabricating the laminates of the present invention are described below. It is noted that the polyesters described in (E) below are useful in the fabrication of both the innermost laminate layer and the outer layers of the laminate, and these polyesters are preferred for the innermost layer construction. Other polymers that may be used for the innermost layer include the polyamides and poly(arylene sulfides) described below. The other polymers described hereinbelow are useful in fabricating the laminate layers other than the innermost layer.

A. Polyarylethersulfones

The polyarylethersulfones of this invention are amorphous thermoplastic polymers containing units of the formula:

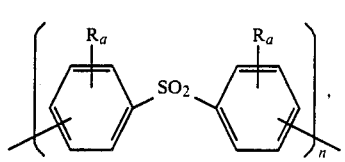   (I)

and

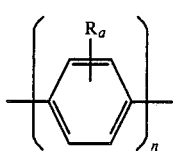   (II)

and/or

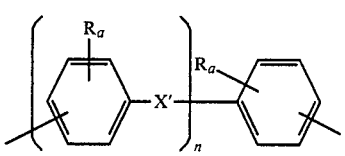   (III)

wherein R is independently hydrogen, $C_1$ to $C_6$ alkyl or $C_4$ to $C_8$ cycloalkyl, X' is independently

wherein $R_1$ and $R_2$ are independently hydrogen or $C_1$ to $C_9$ alkyl, or

wherein $R_3$ and $R_4$ are independently hydrogen or $C_1$ to $C_8$ alkyl, and $a_1$ is an integer of 3 to 8; —S—, —O—, or

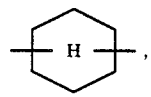

a is an integer of 0 to 4 and n is independently an integer of 1 to 3 and wherein the ratio of unit (I) to the sum of units (II) and/or (III) is greater than 1. The units are attached to each other by an —O— bond.

A preferred polymer of this invention contains units of the formula:

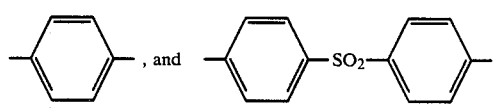

Another preferred polyarylethersulfone of this invention contains units of the formula:

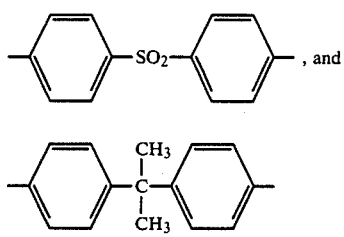

These units are attached to each other by an —O— bond.

The polyarylethersulfone may be random or may have an ordered structure.

The polyarylethersulfones of this invention have a reduced viscosity of from about 0.4 to greater than about 2.5, as measured in N-methylpyrolidone, or other suitable solvent, at 25° C.

The polyarylethersulfones of this invention are prepared by reacting the monomers represented by the following formulae:

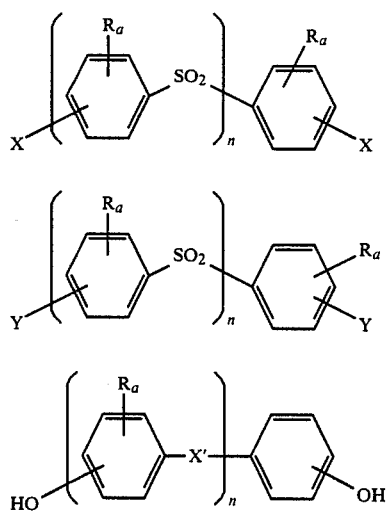

and/or

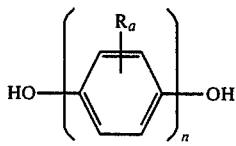

wherein R, a, X' and n are as previously defined, and X and Y are independently selected from Cl, Br, F, $NO_2$ or OH and at least 50 percent of the Y's are OH.

The ratio of the concentration of OH groups to Cl, Br, F and/or $NO_2$ groups used to form the polyarylethersulfone is from about 0.90 to about 1.10, preferably from about 0.98 to about 1.02.

The monomers, represented by formulas (IV), (V), (VI) and (VII), include the following:
2,2-bis(4-hydroxyphenyl)propane,
bis(4-hydroxyphenyl)methane,
4,4'-dihydroxydiphenyl sulfide,
4,4'-dihydroxydiphenyl ether,
4,4'-dihydroxydiphenyl sulfone,
2,4'-dihydroxydiphenyl sulfone,
4,4'-dichlorodiphenyl sulfone,
4,4'-dinitrodiphenyl sulfone,
4-chloro 4'-hydroxydiphenyl sulfone, 4,4'-biphenol, hydroquinone, and the like.

The preferred monomers include hydroquinone, 4,4-biphenol, 2,2-bis(4-hydroxyphenyl) propane, 4,4'-dichlorodiphenyl sulfone, and 4,4'-dihydroxydiphenyl sulfone or 4 chloro-4'-hydroxydiphenyl sulfone.

The polymers of this invention are prepared by contacting substantially equimolar amounts of the hydroxy containing compounds (depicted in formulas (IV) to (VII) supra) and halo and/or nitro containing compounds (depicted in formula (IV) and (V) supra) with from about 0.5 to about 1.0 mole of an alkali metal carbonate per mole of hydroxyl group in a solvent mixture comprising a solvent which forms an azeotrope with water in order to maintain the reaction medium at substantially anhydrous conditions during the polymerization.

The temperature of the reaction mixture is kept at from about 120° to about 180° C., for about 1 to about 5 hours and then raised and kept at from about 200° to about 250° C., preferably from about 210° to about 230° C., for about 1 to 10 hours.

The reaction is carried out in an inert atmosphere, e.g., nitrogen, at atmospheric pressure, although higher or lower pressures may also be used.

The polyarylethersulfone is then recovered by conventional techniques such as coagulation, solvent evaporation, and the like.

The solvent mixture comprises a solvent which forms an azeotrope with water and a polar aprotic solvent. The solvent which forms an azeotrope with water includes an aromatic hydrocarbon such as benzene, toluene, xylene, ethylbenzene, chlorobenzene, and the like.

The polar aprotic solvents employed in this invention are those generally known in the art for the manufacture of polyether sulfones and include sulfur containing solvents such as those of the formula:

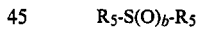

in which each $R_5$ represents a monovalent lower hydrocarbon group free of aliphatic unsaturation, which preferably contains less than about 8 carbon atoms or when connected together represents a divalent alkylene group with b being an integer from 1 to 2 inclusive. Thus, in all of these solvents all oxygens and two carbon atoms are bonded to the sulfur atom. Contemplated for use in this invention are such solvents as those having the formula:

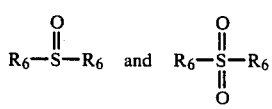

where the $R_6$ groups are independently lower alkyl, such as methyl, ethyl, propyl, butyl, and like groups, and aryl groups such as phenyl and alkylphenyl groups such as the tolyl group, as well as those where the $R_6$ groups are interconnected as in a divalent alkylene bridge such as:

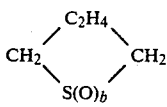

in tetrahydrothiophene oxides and dioxides. Specifically, these solvents include dimethylsulfoxide, dimethylsulfone, diphenylsulfone, diethylsulfoxide, diethylsulfone, diisopropylsulfone tetrahydrothiophene 1,1-dioxide (commonly called tetramethylene sulfone or sulfolane) and tetrahydrothiophene 1 monoxide.

Additionally, nitrogen containing solvents may be used. These include dimethyl acetamide, dimethyl formamide and N-methylpyrolidone.

The azeotrope forming solvent and polar aprotic solvent are used in a weight ratio of from about 10:1 to about 1:1, preferably from about 7:1 to about 5:1.

In the reaction, the hydroxy containing compound is slowly converted, in situ, to the alkali salt thereof by reacting with the alkali metal carbonate. The alkali metal carbonate is preferably potassium carbonate. Mixtures of carbonates such as potassium and sodium carbonate may also be used.

Water is continuously removed from the reaction mass as an azeotrope with the azeotrope forming solvent so that substantially anhydrous conditions are maintained during the polymerization.

It is essential that the reaction medium be maintained substantially anhydrous during the polycondensation. While amounts of water up to about one percent can be tolerated, and are somewhat beneficial when employed with fluorinated dihalobenzenoid compounds, amounts of water substantially greater than this are desirably avoided as the reaction of water with the halo and/or nitro compound leads to formation of phenolic species and only low molecular weight products are secured. Consequently, in order to secure the high polymers, the system should be substantially anhydrous, and preferably contain less than 0.5 percent by weight water during the reaction.

Preferably, after the desired molecular weight has been attained, the polymer is treated with an activated aromatic halide or an aliphatic halide such as methyl chloride or benzyl chloride, and the like. Such treatment of the polymer converts the terminal hydroxyl groups into ether groups which stabilize the polymer. The polymer so treated has good melt and oxidative stability.

B. Polyarylether resin

The poly(aryl ether) resin suitable for blending with the polyarylethersulfone, is different from the polyarylethersulfone and is a linear, thermoplastic polyarylene polyether containing recurring units of the following formula:

—O—E—O—E'— wherein E is the residuum of a dihydric phenol, and E' is the residuum of a benzenoid compound having an inert electron withdrawing group in at least one of the positions ortho and para to the valence bonds; both of said residua are valently bonded to the ether oxygens through aromatic carbon atoms. Such aromatic polyethers are included within the class of polyarylene polyester resins described in, for example, U.S. Pat. Nos. 3,264,536 and 4,175,175. It is preferred that the dihydric phenol be a weakly acidic dinuclear phenol such as, for example, the dihydroxyl diphenyl alkanes or the nuclear halogenated derivatives thereof, such as, for example, the 2,2-bis(4-hydroxyphenyl)propane, 1,1-bis(4-hydroxphenyl)2-phenyl ethane, bis(4-hydroxyphenyl)methane, or their chlorinated derivatives containing one or two chlorines on each aromatic ring. Other materials also termed appropriately bisphenols are also highly valuable and preferred. These materials are the bisphenols of a symmetrical or unsymmetrical joining group, as, for example, ether oxygen (—O—), carbonyl

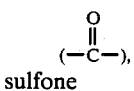

sulfone

or hydrocarbon residue in which the two phenolic nuclei are joined to the same or different carbon atoms of the residue.

Such dinuclear phenols can be characterized as having the structure:

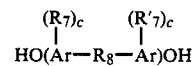

wherein Ar is an aromatic group and preferably is a phenylene group, $R_7$ and $R'_7$ can be the same or different inert substituent groups such as alkyl groups having from 1 to 4 carbons atoms, aryl, halogen atoms, i.e., fluorine, chlorine, bromine or iodine, or alkoxyl radicals having from 1 to 4 carbon atoms, the c's are independently integers having a value of from 0 to 4, inclusive, and $R_8$ is representative of a bond between aromatic carbon atoms as in dihydroxyl-diphenyl, or is a divalent radical, including for example, radicals such as

—O—, —S—, —SO—, —S—S—, —SO$_2$, and divalent hydrocarbon radicals such as alkylene, alkylidene, cycloalkylene, cycloalkylidene, or the halogen, alkyl, aryl or like substituted alkylene, alkylidene and cycloaliphatic radicals as well as aromatic radicals and rings fused to both Ar groups.

Examples of specific dihydric polynuclear phenols including among others: the bis-(hydroxyphenyl) alkanes such as 2,2-bis-(4-hydroxyphenyl)propane, 2,4'-dihydroxydiphenylmethane, bis-(2-hydroxyphenyl)methane, bis-(4-hydroxyphenyl)methane, bis(4-hydroxy-2,6-dimethyl-3-methoxyphenyl)methane, 1,1-bis-(4-hydroxy-phenyl)ethane, 1,2-bis-(4-hydroxyphenyl)ethane, 1,1-bis-(4-hydroxy-2-chlorophenyl)ethane, 1,1-bis-(3-methyl-4-hydroxyphenyl)propane, 1,3-bis-(3-methyl-4-hydroxyphenyl)propane, 2,2-bis-(3-phenyl-4-hydroxyphenyl)propane, 2,2-bis-(3-isopropyl-4-hydroxyphenyl)propane, 2,2-bis-(2-isopropyl-4 hydroxyphenyl)propane, 2,2-bis-(4-hydroxy-naphthyl)propane, 2,2-bis-(4-hydroxyphenyl)pentane, 3,3-bis-(4-hydroxyphenyl)pentane, 2,2-bis-(4-hydroxyphenyl)heptane, bis-(4-hydroxyphenyl)phenylmethane, 2,2-bis-(4-hydroxyphenyl)-1-phenyl-propane, 2,2-bis-(4-hydroxyphenyl)1,1,1,3,3,3,-hexafluoropropane, and the like;

di(hydroxyphenyl)sulfones such as bis-(4-hydroxyphenyl)sulfone, 2,4'-dihydroxydiphenyl sulfone, 5-chloro-2,4'-dihydroxydiphenyl sulfone, 5'-chloro-4,4'-dihydroxydiphenyl sulfone, and the like;

di(hydroxyphenyl)ethers such as bis-(4-hydroxyphenyl)ether, the 4,3'-, 4,2'-2,2'-2,3-,dihydroxyphenyl ethers, 4,4'-dihydroxyl-2,6-dimethyldiphenyl ether, bis-(4-hydroxy-3-isobutylphenyl)ether, bis-(4-hydroxy-3-isopropylphenyl)ether, bis-(4-hydroxy-3-chlorophenyl)ether, bis-(4-hydroxy-3-fluorophenyl)ether, bis-(4-hydroxy-3-bromophenyl)ether, bis-(4-hydroxynaphthyl)ether, bis-(4-hydroxy-3-chloronaphthyl)ether, and 4,4'-dihydroxyl-3,6-dimethoxydiphenyl ether.

As herein used the E' term defined as being the "residuum of the dihydric phenol" of course refers to the residue of the dihydric phenol after the removal of the two aromatic hydroxyl groups. Thus as is readily seen these polyarylene polyethers contain recurring groups of the residuum of the dihydric phenol and the residuum of the benzenoid compound bonded through aromatic ether oxygen atom.

Any dihalobenzenoid or dinitrobenzenoid compound or mixtures thereof can be employed in this invention which compound or compounds has the two halogens or nitro-groups bonded to benzene rings having an electron withdrawing group in at least one of the positions ortho and para to the halogen or nitro group. The dihalobenzenoid or dinitrobenzenoid compound can be either mononuclear where the halogens or nitro groups are attached to the same benzenoid rings or polynuclear where they are attached to different benzenoid rings, as long as there is an activating electron withdrawing group in the ortho or para position of that benzenoid nuclear. Fluorine and chlorine substituted benzenoid reactants are preferred; the fluorine compounds for fast reactivity and the chlorine compounds for their inexpensiveness. Fluorine substituted benzenoid compounds are most preferred, particularly when there is a trace of water present in the polymerization reaction system. However, this water content should be maintained below about 1% and preferably below 0.5% for best results.

An electron withdrawing group can be employed as the activator group in these compounds. It should be, of course, inert under the reaction conditions, but otherwise its structure is not critical. Preferred are the strong activating groups such as the sulfone group

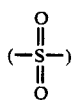

bonding two halogen or nitro substituted benzenoid nuclei as in the 4,4'-dichlorodiphenyl sulfone and 4,4'-difluorodiphenyl sulfone, although such other strong withdrawing groups hereinafter mentioned can also be used with equal ease.

The more powerful of the electron withdrawing groups give the fastest reactions and hence are preferred. It is further preferred that the ring contain no electron supplying groups on the same benzenoid nucleus as the halogen or nitro group; however, the presence of other groups on the nucleus or in the residuum of the compound can be tolerated.

The activating group can be basically either of two types:

(a) monovalent groups that activate one or more halogens or nitro-groups on the same ring such as another nitro or halo group, phenylsulfone, or alkylsulfone, cyano, trifluoromethyl, nitroso, and hetero nitrogen, as in pyridine.

(b) divalent groups which can activate displacement of halogens on two different rings, such as the sulfone group

the carbonyl group

the vinylene group

the sulfoxide group

the azo group —N=N—; the saturated fluorocarbon groups

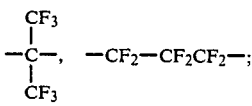

organic phosphine oxides

where $R_9$ is a hydrocarbon group, and the ethylidene group

where A can be hydrogen or halogen.

If desired, the polymers may be made with mixtures of two or more dihalobenzenoid or dinitrobenzenoid compounds. Thus, the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atom or nitro group on the benzenoid nucleus.

The polyarylene polyethers of this invention are prepared by methods well known in the art as for instance the substantially equimolar one-step reaction of a double alkali metal salt of dihydric phenol with a dihalobenzenoid compound in the presence of specific liquid organic sulfoxide or sulfone solvents under substantially anhydrous conditions. Catalysts are not necessary for this reaction.

The polymers may also be prepared in a two-step process in which a dihydric phenol is first converted in situ in the primary reaction solvent to the alkali metal salt of the reaction with the alkali metal, the alkali metal hydride, alkali metal hydroxide, alkali metal alkoxide or the alkali metal alkyl compounds. Preferably, the alkali metal hydroxide is employed. After removing the water which is present or formed, in order to secure substantially anhydrous conditions, the dialkali metal salts of the dihydric phenol are admixed and reacted with about stoichiometric quantities of the dihalobenzenoid or dinitrobenzenoid compound.

Additionally, the polyethers may be prepared by the procedure described in, for example, U.S. Pat. No. 4,176,222 in which a substantially equimolar mixture of at least one bisphenol and at least one dihalobenzenoid are heated at a temperature of from about 100° to about 400° C. with a mixture of sodium carbonate or bicarbonate and a second alkali metal carbonate or bicarbonate having a higher atomic number than that of sodium.

Further, the polyethers may be prepared by the procedure described in Canadian Patent No. 847,963 wherein the bisphenol and dihalobenzenoid compound are heated in the presence of potassium carbonate using a high boiling solvent such as diphenylsulfone.

Preferred polyarylene polyethers of this invention are those prepared using the dihydric polynuclear phenols of the following four types, including the derivatives thereof which are substituted with inert substituent groups

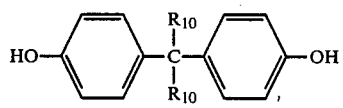
(a)

in which the $R_{10}$ groups represent independently hydrogen, lower alkyl, aryl and the halogen substituted groups thereof, which can be the same or different;

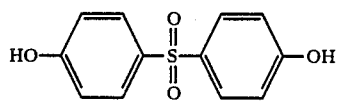
(b)

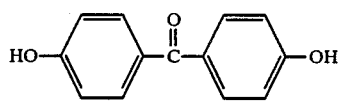
(c)

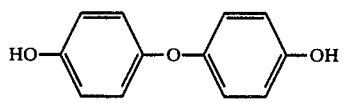
(d)

and substituted derivatives thereof.

It is also contemplated in this invention to use a mixture of two or more different dihydric phenols to accomplish the same ends as above. Thus when referred to above the —E— residuum in the polymer structure can actually be the same or different aromatic residua.

The poly(aryl ether)s have a reduced viscosity of from about 0.35 to about 1.5 as measured in an appropriate solvent at an appropriate temperature depending on the particular polyether, such as in methylene chloride at 25° C.

The preferred poly(aryl ether)s have repeating units of the formula:

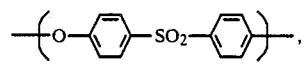

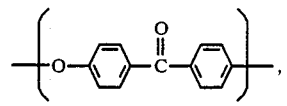

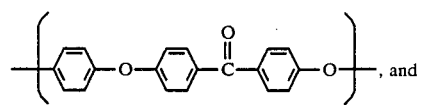, and

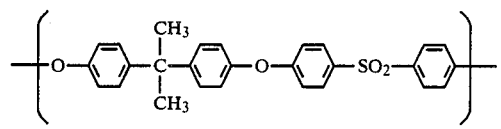

C. Polyarylates

The thermoplastic polymers which may be blended with the polyarylethersulfone or blend of polyarylethersulfone and poly(aryl ether) include polyarylates, polyetherimides, polyesters, aromatic polycarbonates, styrene resins, poly(alkyl acrylates), polyhydroxyethers, poly(arylene sulfide) and polyamides.

A. Polyarylates

The polyarylates which are suitable for use in this invention are derived from a dihydric phenol and at least one aromatic dicarboxylic acid and have a reduced viscosity of from about 0.4 to greater than about 1.0, preferably from about 0.6 to about 0.8 dl/gm, as measured in chloroform (0.5 q/100ml chloroform) or other suitable solvent at 25° C.

A particularly desirable dihydric phenol is of the following formula:

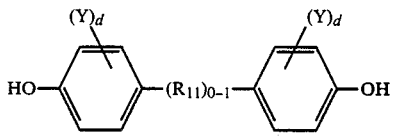

wherein Y is independently selected from, hydrogen, alkyl groups of 1 to 4 carbon atoms, chlorine or bromine, each d, independently, has a value of from 0 to 4, inclusive, and $R_{11}$ is a divalent saturated or unsaturated aliphatic hydrocarbon radical, particularly an alkylene or alkylidene radical having from 1 to 6 carbon atoms, or a cycloalkylidene or cycloalkylene radicals having up to and including 9 carbon atoms, O, CO, $SO_2$, or S. The dihydric phenols may be used individually or in combination.

The dihydric phenols that may be used in this invention include the following:
2,2-bis 4(4-hydroxyphenyl)propane;
bis-(2-hydroxyphenyl)methane,
bis-(4-hydroxyphenyl)methane,
bis-(4-hydroxy-2,6-dimethyl-3-methoxyphenyl) methane,
1,1-bis-(4-hydroxyphenyl)ethane,
1,2-bis-(4-hydroxyphenyl)ethane,
1,1-bis-(4-hydroxy-2-chlorophenyl)ethane,
1,3-bis-(3-methyl-4-hydroxyphenyl)ethane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl) propane,
2,2-bis-(2-isopropyl-4-hydroxyphenyl) propane,
2,2-bis-(4-hydroxyphenyl)pentane,
3,3-bis-(4-hydroxyphenyl)pentane,
2,2-bis-(4-hydroxyphenyl)heptane,
1,2-bis-(4-hydroxyphenyl)1,2 bis-(phenyl)-propane,
4,4'-(dihydroxyphenyl)ether,
4,4'-(dihydroxyphenyl)sulfide,
4,4'-(dihydroxyphenyl)sulfone,
4,4'-(dihydroxyphenyl)sulfoxide,
4,4'-(dihydroxybenzophenone), and naphthalene diols The aromatic dicarboxylic acids that may be used in this invention include terephthalic acid, isophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents, such as halides, alkyl or aryl ethers, and the like. Acetoxybenzoic acid can also be used. Preferably, mixtures of isophthalic and terephthalic acids are used. The isophthalic acid to terephthalic acid ratio in the mixture is about 0:100 to about 100:0, while the most preferred acid ratio is about 75:25 to about 50:50. Also, from about 0.5 to about 20 percent of aliphatic diacids containing from 2 to about 10 carbon atoms, such as adipic acid, sebacic acid, and the like may be additionally used in the polymerization reaction.

The polyarylates of the present invention can be prepared by any of the well known prior art polyester forming reactions, such as the reaction of the acid chlorides of the aromatic dicarboxylic acids with the dihydric phenols; the reaction of the diaryl esters of the aromatic dicarboxylic acids with the dihydric phenols; or the reaction of the aromatic diacids with diester derivatives of the dihydric phenol. These processes are described in, for example, U.S. Pat. Nos. 3,317,464; 3,948,856; 3,780,148; 3,824,213; and 3,133,898.

The polyarylates are preferably prepared by the process as set forth in U.S. Pat. No. 4,321,355. This process comprises the following steps:

(a) reacting an acid anhydride derived from an acid containing from 2 to 8 carbon atoms with at least one dihydric phenol to form the corresponding diester; and (b) reacting said diester with at least one aromatic dicarboxylic acid at a temperature sufficient to form the polyarylate, wherein the improvement comprises removinq residual acid anhydride after formation of the dihydric phenol diester so that its concentration is less than about 1500 parts per million.

The acid anhydride suitable is derived from an acid containinq from 2 to 8 carbon atoms. The preferred acid anhydride is acetic anhydride.

The dihydric phenol is described above.

Generally, the dihydric phenol reacts with the acid anhydride under conventional esterification conditions to form the dihydric phenol diester. The reaction may take place in the presence or absence of a solvent. Additionally, the reaction may be conducted in the presence of a conventional esterification catalyst or in the absence thereof.

D. Polyetherimides

The polyetherimides suitable for use in this invention are well known in the art and are described in, for example, U.S. Pat. Nos. 3,847,867, 3,838,097 and 4,107,147.

The polyetherimides are of the following formula:

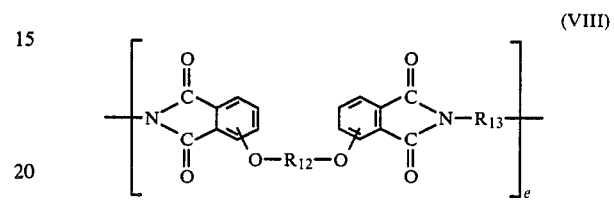

(VIII)

wherein e is an integer greater than 1, preferably from about 10 to about 10,000 or more, $-O-R_{12}-O-$ is attached to the 3 or 4 and 3' or 4' positions and $R_{12}$ is selected from (a) a substituted or unsubstituted aromatic radical such as

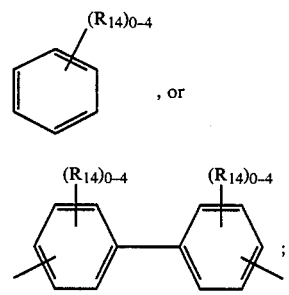

, or (b) a divalent radical of the formula

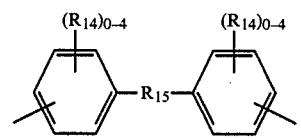

wherein $R_{14}$ is independently $C_1$ to $C_6$ alkyl, aryl or halogen and $R_{15}$ is selected from $-O-$, $-S-$,

$-SO_2-$, $-SO-$, alkylene of 1 to 6 carbon atoms, cycloalkylene of 4 to 8 carbon atoms, alkylidene of 1 to 6 carbon atoms or cycloalkylidene of 4 to 8 carbon atoms, $R_{13}$ is selected from an aromatic hydrocarbon radical having from 6 to 20 carbon atoms and halogenated derivatives thereof, or alkyl substituted derivatives thereof, wherein the alkyl group contains 1 to 6 carbon atoms, alkylene and cycloalkylene radicals having from 2 to 20 carbon atoms and $C_2$ to $C_8$ alkylene terminated polydiorganosiloxane or a divalent radical of the formula

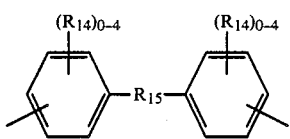

wherein $R_{14}$ and $R_{15}$ are as previously defined.

The polyetherimides may also be of the following formula:

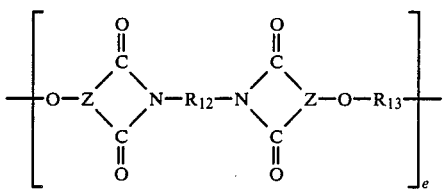

wherein —O—Z is a member selected from

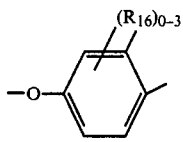

wherein $R_{16}$ is independently hydrogen, lower alkyl or lower alkoxy

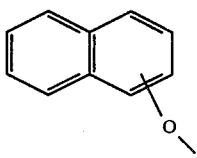

and,

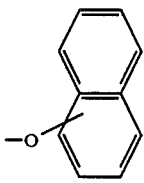

wherein the oxygen may be attached to either ring and located ortho or para to one of the bonds of the imide carbonyl groups, $R_{12}$ and $R_{13}$ and e are as previously defined.

These polyetherimides are prepared by methods well known in the art as set forth in, for example, U.S. Pat. Nos. 3,833,544, 3,887,588, 4,017,511, 3,965,125 and 4,024,110.

The polyetherimides of Formula (VIII) can, for example, be obtained by any of the methods well-known to those skilled in the art including the reaction of any aromatic bis(ether anhydride)s of the formula

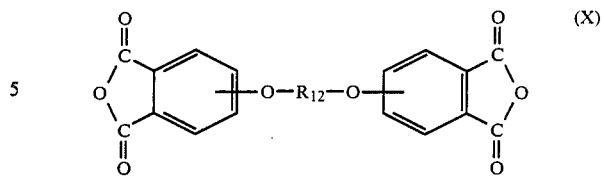

where $R_{12}$ is as defined hereinbefore, with a diamino compound of the formula

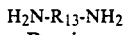

$H_2N\text{-}R_{13}\text{-}NH_2$ where $R_{13}$ is as defined hereinbefore. In general, the reactions can be advantageously carried out employing well-known solvents, e.g., o-dichlorobenzene, m-cresol/toluene, N,N-dimethylacetamide, etc., in which to effect interaction between the dianhydrides and diamines, at temperatures of from about 20° to about 250° C. Alternatively, the polyetherimides can be prepared by melt polymerization of any dianhydrides of Formula (X) with any diamino compound of Formula (XI) while heating the mixture of the ingredients at elevated temperatures with concurrent intermixing. Generally, melt polymerization temperatures between about 200° to 400° C. and preferably 230° to 300° C. can be employed. Any order of addition of chain stoppers ordinarily employed in melt polymerizations can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mole percent) of diamine can be employed resulting in the production of polyetherimides of Formula I have an intrinsic viscosity $\eta$ greater than 0.2 deciliters per gram, preferably 0.35 to 0.60, or 0.7 deciliters per gram or even higher when measured in m-cresol at 25° C.

The aromatic bis(ether anhydride)s of Formula (X) include, for example, 2,2-bis[4-(2,3-dicarboxyphenoxy)phenyl]propane dianhydride;

4,4—bis(2,3 dicarboxyphenoxy)diphenyl ether dianhydride;

1,3-bis(2,3-dicarboxyphenoxy)benzene dianhydride;

4,4'-bis(2,3-dicarboxyphenoxy)diphenyl sulfide dianhydride;

1,4-bis(2,3-dicarboxyphenoxy)benzene dianhydride;

4,4'-bis(2,3-dicarboxyphenoxy)benzophenone dianhydride;

4,4'bis(2,3 dicarboxyphenoxy)diphenyl sulfone dianhydride;

2,2-bis[4-(3,4-dicarboxyphenoxy)phenyl]propane dianhydride;

4,4'-bis(3,4-dicarboxyphenoxy)diphenyl ether dianhydride;

4,4'-bis(3,4-dicarboxyphenoxy)diphenyl sulfide dianhydride;

1,3-bis(3,4-dicarboxyphenoxy)benzene dianhydride;

1,4-bis(3,4-dicarboxyphenoxy)benzene dianhydride;

4,4'-bis(3,4-dicarboxyphenoxy)benzophenone dianhydride;

4-(2,3-dicarboxyphenoxy)-4'-(3,4-dicarboxyphenoxy)-diphenyl-2,2-propane dianhydride; etc. and mixtures of such dianhydrides.

The organic diamines of Formula (XI) include, for example, m-phenylenediamine, p-phenylenediamine, 2,2-bis(p-aminophenyl)propane, 4,4'-diaminodiphenylmethane, 4,4'-diaminodiphenyl sulfide, 4,4'-diaminodiphenyl sulfone, 4,4'-diaminodiphenyl ether, 1,5-diaminonaphthalene, 3,3'-dimethylbenzidine, 3,3'-dimethoxybenzidine, The polyetherimides of formula (X) may, for example, be prepared by effecting reaction in the presence of a dipolar aprotic solvent of a mixture of ingredients comprising, for instance, (1) a bis(nitrophthalimide) of the general formula:

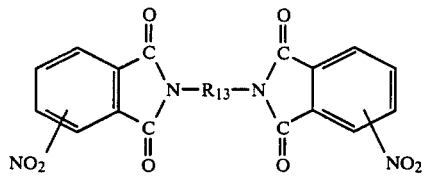
(XII)

wherein $R_{13}$ is defined as hereinabove, and (2) an alkali metal salt of an organic compound of the general formula:

MO-$R_{12}$-OM wherein M is an alkali metal and $R_{12}$ is defined as hereinabove.

The bis(nitrophthalimide) used in preparing the polymer is formed by reacting a diamine of the formula described above, $NH_2$-$R_{13}$-$NH_2$, with a nitro-substituted aromatic anhydride of the formula:

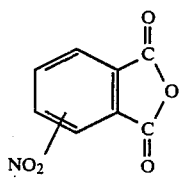
(XIV)

The molar ratio of diamine to anhydride should ideally be about 1:2 respectively. The initial reaction product is a bis(amide-acid) which is subsequently dehydrated to the corresponding bis(nitrophthalimide).

The diamines are described, supra.

The preferred nitrophthalic anhydrides useful in the present invention are 3-nitrophthalic anhydride, 4-nitrophthalic anhydride and mixtures thereof. These reactants are commercially available in reagent grade. They may also be prepared by the nitration of phthalic anhydride using procedures described in Organic Syntheses, Collective Vol. I, Wiley (1948), page 408. Certain other closely related nitroaromatic anhydrides may also be used in the reaction and are illustrated for example by 2-nitronaphthalic anhydride, 1-nitro-2,3-naphthalenedicarboxylic anhydride and 3-methoxy-6-nitrophthalic anhydride, and the like.

With reference to the alkali metal salts of formula (XIII) among the divalent carbocyclic aromatic radicals which $R_{12}$ may represent (mixtures of such radicals are also included) are, for instance, divalent aromatic hydrocarbon radicals of from 6 to 20 carbon atoms, such as phenylene, biphenylene, naphthylene, etc. Included are residues of, e.g. hydroquinone, resorcinol, chlorohydroquinone, etc. In addition, $R_{12}$ may be a residue of a dihydroxyl diarylene compound in which the aryl nuclei are joined by either an aliphatic group, a sulfoxide group, sulfonyl group, sulfur, carbonyl group, oxygen, etc. Typical of such diarylene compounds are the following:
2,4-dihydroxydiphenylmethane;
bis(2-hydroxyphenyl)methane;
2,2-bis(4-hydroxyphenyl)propane;
bis(4-hydroxyphenyl)methane;
bis(4-hydroxy-5-nitrophenyl)methane;
bis(4-hydroxy-2,6-dimethyl-3-methoxyphenyl)methane;
1,1-bis(4-hydroxyphenyl)ethane;
1,2-bis(4-hydroxyphenyl)ethane;
1,1-bis(4-hydroxy-2-chlorophenyl)ethane;
1,1-bis(2,5-dimethyl-4-hydroxyphenyl)ethane;
1,3-bis(3-methyl-4-hydroxyphenyl)propane;
2,2-bis(3-phenyl-4-hydroxyphenyl)propane;
2,2-bis(3-isopropyl-4-hydroxyphenyl)propane;
2,2-bis(4-hydroxynaphthyl)propane;
hydroquinone;
naphthalene diols;
bis(4-hydroxyphenyl)ether;
bis(4-hydroxyphenyl)sulfide;
bis(4-hydroxyphenyl)sulfone; and the like.

When dialkali metal salts of formula (XIII) are used with the compound illustrated by formula (XII), the ingredients are advantageously present in an equal molar ratio for optimum molecular weight and properties of the polymer. Slight molar excesses, e.g., about 0.001 to 0.10 molar excess of either the dinitro-substituted organic compound or of the dialkali metal salt of formula (XIII) may be employed. When the molar ratios are approximately equal, the polymer is substantially terminated by a=Z $NO_2$ at one end and a phenolic group at the other end. If there is a molar excess of one compound, that particular terminal group will predominate.

The conditions of reaction whereby the alkali-metal salt of formula (XIII) is reacted with the dinitro-substituted organic compound of formula (XII) can be varied widely. Generally, temperatures of the order of about 25° to about 150° C. are advantageously employed, although it is possible to employ lower or higher temperature conditions depending on the ingredients used, the reaction product sought, time of reaction, solvent employed, etc. In addition to atmospheric pressure, superatmospheric pressures and subatmospheric pressures may be employed dependinq upon the other conditions of reaction, the ingredients used, the speed at which it is desired to effect reaction, etc.

The time of reaction also can be varied widely depending on the ingredients used, the temperature, the desired yield, etc. It has been found that times varying from about 5 minutes to as much as 30 to 40 hours are advantageously employed to obtain the maximum yield and desired molecular weight. Thereafter the reaction product can be treated in the appropriate manner required to effect precipitation and/or separation of the desired polymeric reaction product. Generally, common solvents such as alcohols (e.g. methanol, ethanol, isopropyl alcohol, etc.) and aliphatic hydrocarbons (e.g. pentane, hexane, octane, cyclohexane, etc.) may be employed as precipitants for this purpose.

It is important that the reaction between the dinitro-substituted organic compound of formula V and the alkali-metal salt of formula VI (mixtures of such alkali-metal salts can also be used) be carried out in the presence of a dipolar aprotic solvent.

The polymerization is performed under anhydrous conditions usually using dipolar aprotic solvents such as dimethylsulfoxide which are added in varying amounts depending upon the particular polymerization. A total quantity of solvent, dipolar aprotic solvent or mixture of such solvent with an aromatic solvent sufficient to qive a final solution containing 10 to 20% by weight of polymer is preferably employed.

The preferred polyetherimides include those having repeating units of the following formula:

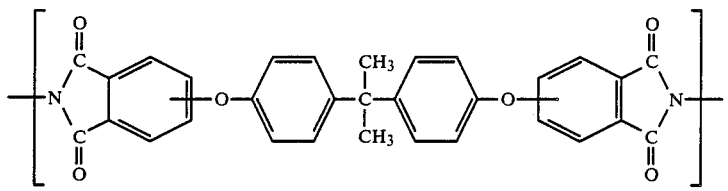

E. Polyesters

The polyesters which are suitable for use herein are derived from an aliphatic or cyloaliphatic diol, or mixtures thereof, containing from 2 to about 10 carbon atoms and at least one aromatic dicarboxylic acid. The polyesters which are derived from an aliphatic diol and an aromatic dicarboxylic acid have repeating units of the following general formula:

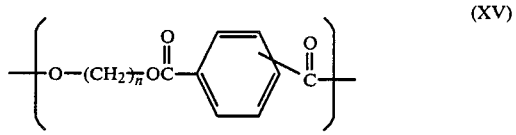

(XV)

wherein n is an integer of from 2 to 10.

The preferred polyesters are poly(ethylene terephthalate) and poly(butylene) terephthalate in view of their commercial availability.

Also contemplated herein are the above polyesters with minor amounts, e.g., from 0.5 to about 2 percent by weight, of units derived from aliphatic acids and/or aliphatic polyols, to form copolyesters. The aliphatic polyols include glycols, such as poly(ethylene glycol). These can be made following the teachings of, for example, U.S. Pat. Nos. 2,465,319 and 3,047,539.

The polyesters which are derived from a cycloaliphatic diol and an aromatic dicarboxylic acid are prepared by condensing either the cis - or trans-isomer (or mixtures thereof) of, for example, 1,4-cyclohexanedimethanol with an aromatic dicarboxylic acid so as to produce a polyester having recurring units of the following formula:

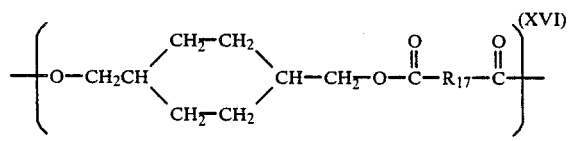

(XVI)

wherein the cyclohexane ring is selected from the cis- and trans- isomers thereof and $R_{17}$ represents an aryl radical containing 6 to 20 carbon atoms and which is the decarboxylated residue derived from an aromatic dicarboxylic acid.

Examples of aromatic dicarboxylic acids indicated b $R_{17}$ in formula IX, are isophthalic or terephthalic acid, 1,2-di(p carboxyphenyl)ethane, 4,4'-dicarboxydiphenyl ether, etc., and mixtures of these. All of these acids contain at least one aromatic nucleus. Fused rings can also be present, such as in 1,4-or 1,5-naphthalenedicarboxylic acids. The preferred dicarboxylic acids are terephthalic acid or a mixture of terephthalic and isophthalic acids.

A preferred polyester may be derived from the reaction of either the cis-or trans-isomer (or a mixture thereof) of 1,4-cyclohexanedimethanol with a mixture of isophthalic and terephthalic acids. These polyesters have repeating units of the formula:

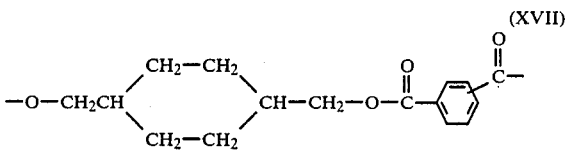

(XVII)

Another preferred polyester is a copolyester derived from a cyclohexane dimethanol, an alkylene glycol and an aromatic dicarboxylic acid. These copolyesters are prepared by condensing either the cis - or trans-isomer (or mixtures thereof) of, for example, 1,4-cyclohexanedimethanol and an alkylene glycol with an aromatic dicarboxylic acid so as to produce a copolyester having repeating units of the following formula:

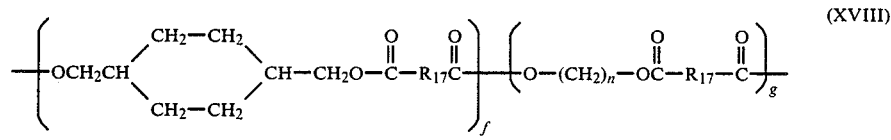

(XVIII)

wherein the cyclohexane ring is selected from the cis - and trans-isomers thereof, $R_{17}$ is as previously defined, n is an integer of 2 to 10g, the f units comprise from about 10 to about 90 percent by weight and the g units comprise from about 10 to about 90 percent by weight.

The preferred copolyester may be derived from the reaction of either the cis- or trans-isomer (or mixtures thereof) of 1,4-cyclohexanedimethanol and ethylene glycol with terephthalic acid in a molar ratio of 1:2:3. These copolyesters have repeating units of the following formula:

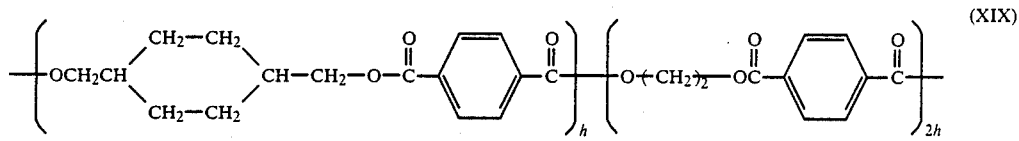

(XIX)

wherein h can be 10 to 10,000. Block as well as random copolymers are possible.

The polyester as described herein are either commercially available or can be produced by methods well known in the art, such as those set forth in, for example, U.S. Pat. No. 2,901,466.

The polyesters used herein have an intrinsic viscosity of from about 0.4 to about 2.0 dl/g. as measured in a 60:40 phenol/tetrachloroethane mixture or similar solvent at 23 to 30° C.

F. Aromatic Polycarbonate

The thermoplastic aromatic polycarbonates that can be employed herein are homopolymers and copolymers and mixtures thereof, which have an intrinsic viscosity of from about 0.4 to about 1.0 dl./g. as measured in methylene chloride at 25° C. The polycarbonates are prepared by reacting a dihydric phenol with a carbonate precursor. Typical of some of the dihydric phenols that may be employed are bisphenol-A, bis(4-hydroxyphenyl)methane, 2,2-bis(4-hydroxy-3-methylphenyl)propane, 4,4-bis(4-hydroxyphenyl)heptane, 2-2-(3,5,3',5'tetrabromo-4,4'-dihydroxydiphenyl)propane, (3,3'di-chloro-4,4'dihydroxydiphenyl)methane, and the like. Other dihydric phenols of the bisphenol type are described in, for example, U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyesters.

The carbonate precursor may be either a carbonyl halide, a carbonate ester, or a haloformate. The carbonyl halides which can be employed herein are carbonyl bromide, carbonyl chloride and mixtures thereof. Typical of the carbonate esters which may be employed herein are diphenyl carbonate, di-(halophenyl)carbonates, such as di-(chlorophenyl)carbonate or di-(bromophenyl)carbonate, etc., di-(alkylphenyl)carbonates such as di(tolyl)carbonate, di(naphthyl)carbonate, di(chloronaphthyl)carbonate, etc. or mixtures thereof. The haloformates suitable for use herein include bis-haloformate of dihydric phenols for example, bischloroformates of bisphenol-A, of hydroquinone, etc. or glycols for example, bishaloformates of ethylene glycol, neopentyl glycol, polyethylene glycol, etc. While other carbonate precursors will be apparent to those skilled in the art, carbonyl chloride, also known as phosgene, is preferred.

The aromatic polycarbonate polymers may be prepared by methods well known in the art by using phosgene or a haloformate and by employing a molecular weight regulator, an acid acceptor and a catalyst. The molecular weight requlators which can be employed in carrying out the process include monohydric phenols, such as phenol, para-tertiary-butylphenol, para-bromophenol, primary and secondary amines, etc. Preferably, a phenol is employed as the molecular weight regulator.

A suitable acid acceptor may be either an organic or an inorganic acid acceptor. A suitable organic acid acceptor is a tertiary amine and includes materials, such as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of, for example, bisphenol-A with phosgene. Suitable catalysts include tertiary amines, such as triethylamine, tripropylamine, N,N-dimethylaniline, quaternary ammonium compounds, such as tetraethylammonium bromide, cetyl triethyl ammonium bromide, tetra-n-heptylammonium iodide, and quaternary phosphonium compounds, such as n-butyltriphenyl-phosphonium bromide and methyl-triphenyl phosphonium bromide.

The polycarbonates can be prepared in a one-phase (homogeneous solution) or a two-phase (interfacial) systems when phosgene, or a haloformate are used. Bulk reactions are possible when the diarylcarbonate precursors are used.

Also, aromatic polyester carbonates may be used. These are described in, for example, U.S. Pat. No. 3,169,121. A preferred polyester carbonate results from the condensation of phosgene, terephthaloyl chloride, isophthaloyl chloride with bisphenol-A and a small amount of p-tertbutylphenol. Also useful are the tetramethyl bis-S-polycarbonates and the co-polycarbonates employing TMBS. These latter are commercially available as LEXAN HT.

G. Styrene Resin

The styrene resins suitable for use herein include ABS type polymers, the molecules of which contain two or more polymeric parts of different compositions that are bonded chemically. The polymer is preferably prepared by polymerizinq a conjugated diene, such as butadiene or a conjugated diene with a monomer copolymerizable therewith, such as styrene, to provide a polymeric backbone. After formation of the backbone, at least one grafting monomer, and preferably two, are polymerized in the presence of the prepolymerized backbone to obtain the graft polymer. These resins are prepared by methods well known in the art.

The backbone polymer, as mentioned, is preferably a conjugated diene polymer such as polybutadiene, polyisoprene, or a copolymer, such as butadiene-styrene, butadiene-acrylonitrile, or the like.

The specific conjugated diene monomers normally utilized in preparing the backbone of the graft polymer are generically described by the following formula:

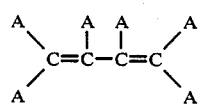

wherein A is selected from the group consisting of hydrogen, alkyl groups containing from one to five carbon atoms, chlorine or bromine. Examples of dienes that may be used are butadiene, isoprene, 1,3-heptadiene, methyl 1,3-pentadiene, 2,3-dimethyl-1,3,-butadiene, 2-ethyl -1,3-pentadiene; 1,3-and 2,4-hexadienes, chloro and bromo substituted butadienes such as dichlorobutadiene, bromobutadiene, dibromobutadiene, mixtures thereof, and the like. A preferred conjugated diene is butadiene.

One monomer or group of monomers that may be polymerized in the presence of the prepolymerized backbone are monovinylaromatic hydrocarbons. The monovinylaromatic monomers utilized are generically described by the following formula:

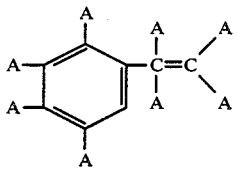

wherein A is as previously defined. Examples of the monovinylaromatic compounds and alkyl-, cycloalkyl-, aryl-, alkaryl-, aralkyl-, alkoxy-, aryloxy-, and other substituted vinylaromatic compounds include styrene, 3-methylstyrene; 3,5-diethylstyrene, 4-n-propylstyrene, δ-bromostyrene, dichlorostyrene, dibromostyrene, tetra-chlorostyrene, mixtures thereof, and the like. The preferred monovinylaromatic hydrocarbons used are styrene and/or a δ-methylstyrene.

A second group of monomers that may be polymerized in the presence of the prepolymerized backbone are acrylic monomers such as acrylonitrile, substituted acrylonitrile and/or acrylic acid esters, exemplified by acrylonitrile, and alkyl acrylates such as ethyl acrylate and methyl methacrylate.

The acrylonitrile, substituted acrylonitrile, or acrylic acid esters are described generically by the following formula:

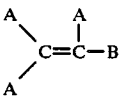

wherein A is as previously defined and B is selected from the group consisting of cyano and carbalkoxy wherein the alkoxy group of the carbalkoxy contains from one to about twelve carbon atoms. Examples of such monomers include acrylonitrile, ethacrylonitrile, methacrylonitrile, δ-chloroacrylonitrile, β-chloroacrylonitrile, δ-bromoacrylonitrile, and β-bromoacrylonitrile, methyl acrylate, methyl methacrylate, ethyl acrylate, butyl acrylate, propyl acrylate, isopropyl acrylate, and mixtures thereof. The preferred acrylic monomer is acrylonitrile and the preferred acrylic acid esters are ethyl acrylate and methyl methacrylate.

In the preparation of the graft polymer, the conjugated diolefin polymer or copolymer exemplified by a 1,3-butadiene polymer or copolymer comprises about 50% by weight of the total graft polymer composition. The monomers polymerized in the presence of the backbone, exemplified by styrene and acrylonitrile, comprise from about 40 to about 95% by weight of the total graft polymer composition.

The second group of grafting monomers, exemplified by acrylonitrile, ethyl acrylate or methyl methacrylate, of the graft polymer composition, preferably comprise from about 10% to about 40% by weight of the total graft copolymer composition. The monovinylaromatic hydrocarbon exemplified by styrene comprise from about 30 to about 70% by weight of the total graft polymer composition.

In preparing the polymer, it is normal to have a certain percentage of the polymerizing monomers that are grafted on the backbone combine with each other and occur as free copolymer. If styrene is utilized as one of the grafting monomers and acrylonitrile as the second grafting monomer, a certain portion of the composition will copolymerize as free styrene-acrylonitrile copolymer. In the case where δ-methylstyrene (or other monomer) is substituted for the styrene in the composition used in preparing the graft polymer, a certain percentage of the composition may be an δ-methylstyreneacrylonitrile copolymer. Also, there are occasions where a copolymer, such as δ-methylstyreneacrylonitrile, is added to the graft polymer copolymer blend. When the graft polymer copolymer blend is referred to herein, it is meant optionally to include at least one copolymer blended with the graft polymer composition and which may contain up to 90% of free copolymer.

Optionally, the elastomeric backbone may be an acrylate rubber, such as one based on n-butyl acrylate, ethylacrylate, 2-ethylhexylacrylate, and the like. Additionally, minor amounts of a diene may be copolymerized in the acrylate rubber backbone to yield improved grafting with the matrix polymer.

These resins are well known in the art and many are commercially available.

H. Poly(Alkyl Acrylate) Resin

The poly(alkyl acrylate) resin which may be used herein includes a homopolymer of methyl methacrylate (i.e., polymethyl methacrylate) or a copolymer of methyl methacrylate with a vinyl monomer (e.g., acrylonitrile, N-allylmaleimide, vinyl chloride or N-vinyl maleimide), or an alkyl acrylate or methacrylate in which the alkyl group contains from 1 to 8 carbon atoms, such as methyl acrylate, ethyl acrylate, butyl acrylate, ethyl methacrylate and butyl methacrylate. The amount of methyl methacrylate is greater than about 70% by weight of this copolymer resin.

The alkyl acrylate resin may be grafted onto an unsaturated elastomeric backbone, such as polybutadiene, polyisoprene, and/or butadiene or isoprene copolymers. In the case of the graft copolymer, the alkyl acrylate resin comprises greater than about 50 weight percent of the graft copolymers.

These resins are well known in the art and are commercially available.

The methyl methacrylate resins have a reduced viscosity of from 0.1 to about 2.0 dl/g in a one percent chloroform solution at 25° C.

I. Polyhydroxyethers

The thermoplastic polyhydroxyethers which may be used herein have the following general formula:

where F is the radical residuum of a dihydric phenol, F' is a radical residuum of an epoxide selected from mono- and diepoxides and which contain from 1 to 2 hydroxyl groups, and j is an integer which represents the degree of polymerization and is at least about 30 and preferably is above about 80.

In general, thermoplastic polyhydroxyethers are prepared by contacting, under polymerization conditions, a dihydric phenol and an epoxide containing from 1 to 2 epoxide groups in substantially eguimolar amounts by methods well known in the art.

Any dihydric phenol can be used in forming polyhydroxyethers. Illustrative dihydric phenols are mononuclear dihydric phenols such as hydroguinone, resorcinol, and the like as well as the polynuclear phenols. The dihydric polynuclear phenols have the general formula:

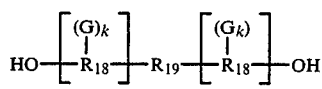

wherein the $R_{14}$'s are independently an aromatic divalent hydrocarbon radical, such as naphthylene and phenylene with phenylene being preferred, the G's may be the same or different and are selected from alkyl radicals, such as methyl, n-propyl, n-butyl, n-hexyl, n octyl and the like, preferably alkyl radicals having 1 to 4 carbon atoms; halogen atoms, i.e., chlorine, bromine, iodine, or fluorine; or alkoxy radicals such as methoxy, methoxymethyl, ethoxy, ethoxyethyl, n-butyloxy, amyloxy and the like, preferably an alkoxy radical having 1 to 4 carbon atoms, the k's are independently integers of 0 to 4, $R_{19}$ is independently selected from a divalent saturated aliphatic hydrocarbon radical particularly alkylene or alkylidene radicals having from 1 to 8 carbons atoms, especially $C(CH_3)_2$, cycloalkylene, cycloalkylidene or any other divalent group such as O, S, SO, $SO_2$, CO, a chemical bond, etc. Particularly preferred are dihydric polynuclear phenols having the general formula:

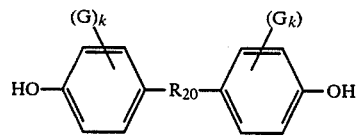

wherein G and k are as previously defined, and $R_{20}$ is an alkylene or alkylidene group, preferably having from 1 to 3 carbon atoms, cycloalkylene or cycloalkylidene having 6 to 12 carbon atoms.

Diepoxides useful for the preparation of polyhydroxyethers may be represented by repeating units of the following formula:

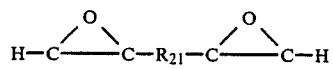

wherein $R_{21}$ is representative of a bond between adjacent carbon atoms or a divalent organic radical such as an aliphatic, aromatic, alicyclic, heterocyclic or acyclic arrangement of atoms.

Other diepoxides which can be mentioned include those wherein two oxirane groups are linked through an aromatic ether, i.e., compounds having the grouping:

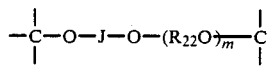

wherein $R_{22}$ is a divalent organic radical, J is a divalent aromatic radical residuum of a dihydric phenol, such as those listed above in the description of dihydric phenols, and m is an integer from 0 to 1 inclusive.

Still other diepoxides include ethers wherein the oxirane groups are connected to vicinal carbon atoms at least one pair of which is a part of a cycloaliphatic hydrocarbon.

These polyhydroxy ethers are prepared by methods well known in the art, such as those described in, for example, U.S. Pat. No. 3,238,087; 3,305,528; 3,924,747; and 2,777,051.

J. Polyamides

The polyamide polymers which may be used herein are well known in the art. The polyamide polymers include homopolymers as well as copolymers. These polymers may be formed by conventional methods from the condensation of bifunctional monomers, by the condensation of diamines and dibasic acids, as well as by addition polymerization. Numerous combinations of diacids, such as carbonic acid, oxalic acid, glutaric acid, adipic acid, pimelic acid, suberic acid, azelaic acid, sebacic acid, dodecanedioic acid, isophthalic acid, terephthalic acid, and the like, diamines, such as hydrazine, ethylenediamine, hexamethylenediamine, 1,8-octanediamine, piperazine, and the like, and amino acids are possible. The chains between functional groups in the reactants may comprise linear or branched aliphatic hydrocarbons, or alicyclic or aromatic rings. They may also contain hetero atoms such as oxygen, sulfur, and nitrogen. Secondary diamines lead to the formation of N-substituted polyamides.

Also, included herein are the aromatic polyamide polymers which are aromatic in both the diamine and the dibasic acid. The dibasic acids include terephthalic acid, isophthalic acid, phthalic acid, and the like. The aromatic diamines include o-phenylenediamine, 2,4-diaminotoluene, 4,4'-methylenedianiline, and the like.

The polyamide polymers are prepared by methods well known in the art, such as by direct amidation which is the reaction of amine groups with carboxyls accompanied by elimination of water; low temperature polycondensation of diamines and diacid chlorides, ring-opening polymerization, addition of amines to activated double bonds, polymerization of isocyanates and reaction of formaldehyde with dinitriles.

The polyamide polymers include polyhexamethylene-adipamide, i.e., nylon 6,6; poly(ε-caprolactam), i.e., nylon-6; polypropiolactam, i.e., nylon-3; poly(pyrrolidin-2-one), i.e., nylon-4; poly(ω-enanthamide), i.e., nylon-7; polycapryllactam, i.e., nylon-8; poly(ω-pelargonamide), i.e., nylon-9; poly(11-aminodecanoic acid), i.e., nylon-10; poly(ω-undecaneamide), i.e., nylon-11; polyhexamethyleneterephthalamide, i.e., nylon-6,T, nylon 6,10, and the like.

K. Poly(arylene sulfide)

The poly(arylene sulfide)s which are suitable for use herein are solid, have a melting point of at least about 150° F. and are insoluble in common solvents. Such resins can be conveniently prepared by the process disclosed in, for example, U.S. Pat. No. 3,354,129. Briefly, the process comprises the reaction of an alkali metal sulfide and a polyhalo ring-substituted aromatic compound in the presence of a suitable polar organic compound, as for example, the reaction of sodium sulfide with dichlorobenzene in the presence of N-methyl-2-pyrrolidone to form poly(phenylene-sulfide).

The resulting polymer contains the aromatic nucleus of the polyhalo-substituted monomer coupled in repeating units predominantly through a sulfur atom. The polymers which are preferred for use according to this invention are those polymers having the repeating unit —$R_{23}$—S— where $R_{23}$ is phenylene, biphenylene, naphthylene, or a lower alkyl-substituted derivative thereof. By lower alkyl is meant alkyl groups having one to six carbon atoms such as methyl, propyl, isobutyl, n-hexyl and the like.

The preferred poly(arylene sulfide) is poly(phenylene sulfide), a crystalline polymer with a repeating structural unit comprising a para-substituted benzene ring and a sulfur atom which may be described by the following formula, where p has a value of at least about 50.

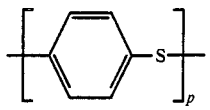

Suitable poly(phenylene sulfide) compositions are available commercially under the trade name Ryton of the Phillips Petroleum Company. Preferably, the poly(phenylene sulfide) component has a melt flow index, measured at 600° F. using a 5 Kg. weight and a standard orifice, within the range of from about 10 to about 7000 dg./min..

The term poly(arylene sulfide) is meant to include not only homopolymers but also arylene sulfide copolymers, terpolymers and the like.

OTHER ADDITIVES

Other additives which may be used in combination with the thermoplastic polymers include mineral fillers such as carbonates including chalk, calcite and dolomite; silicates including mica, talc, wollastonite; silicon dioxide; glass spheres; glass powders; aluminum; clay; guartz; and the like. Additional additives include glass fibers; pigments, such as titanium dioxide; thermal stabilizers such as zinc oxide; ultraviolet light stabilizers, plasticizers, and the like.

The mineral fillers may be used in amounts of up to about 30, preferably up to about 25 weight percent. The pigments are generally used in amounts of up to about 10 weight percent. The stabilizers are used in stabilizing amounts to stabilize the composition for the effect desired.

FABRICATION

The thermoplastic polymer, and one or more optional additives is generally compounded in an extruder. The compounding is carried out at temperatures of from about 200° C. to about 400° C. The compounded material may be pelletized by conventional technigues.

The compounded material is extruded into a sheet and then thermoformed into the desired article by methods well known in the art.

The thermoplastic polymer either alone or in combination with other materials may be fed in particulate form (such as pellets, granules, particles, powders, and the like) into an extruder which extrudes the material into a laminate. The extruders which are used to form the laminate are well known in the art. Typically, the extruder may be a 2½ inch Davis standard extruder containing an extruder screw with a length to diameter ratio of 24 to 1.

In general, laminate may be prepared by the procedure and using the apparatus as described in U.S. Pat. No. 3,557,265. In the method of said patent, film or sheet having a plurality of layers is formed by deforming a flowing stream having layers of diverse thermoplastic material wherein the cross-sectional configuration of the plurality of flowing streams is altered by reducing the dimension of the stream in a direction generally perpendicular to the interfaces between the individual streams and by increasing the dimension of the stream in a direction generally parallel to the interface to provide a sheet having a laminar structure.

However, when using a material for the innermost layer having a significantly lower melt viscosity than the outer layers (e.g., PET inner layer and polyarylethersulfone outer layers), a multi-manifold extrusion die generally is reguired. By way of illustration, if the melt viscosity of the innermost layer differs from that of the outer layers by at least about a factor of four, the use of a multi-manifold die is preferred. Multi-manifold dies are well-known in the art. A preferred variable-vane multi-manifold die is described in U.S. Pat. No. 4,553,308, incorporated herein by reference.

The laminates of this invention are generally from about 15 to about 40 mils thick, preferably from about 20 to about 30 mils thick. The inner layer ranges from about 30% to about 98% of the total laminate thickness, preferably from about 60% to about 90% of the total laminate thickness.

Typically, the laminate will comprise at least three layers and, if desired for some purpose, five, seven or nine layers. For example, if a PET inner layer and nylon type polyamide outer layers are selected, it is desirable to utilize a pair of adhesive intermediate layers to provide the following configurations: nylon/adhesive/PET/adhesive/nylon. Although the normal laminate configuration is a balanced, symmetrical one in terms of the content and thickness of the various outer layers, an asymmetrical configuration may be utilized if desired for some purpose. For example, a non-sticking food release layer can be chosen as the food contacting layer in the finished cookware. This non-sticking food release function is not generally needed on the outer surface of the cookware. Additionally, a high temperature resistance function of the outer surface of the cookware may be enhanced by increasing the layer thickness of the material comprising the outer cookware surface layer relative to the total proportion of that material in the laminate.

The laminate is then thermoformed into the shape of the desired article. Thermoforming may be accomplished by methods well known in the art such as those described in, for example, Engineering Polymer Science and Technology, Volume 13, 1971, pages 832-843. Generally, the laminate is vacuum formed into a female mold. In this process, the laminate is locked in a frame around its periphery only, is heated to a predetermined temperature for a predetermined time and then brought into contact with the edge of the mold. This contact creates a seal so that it is possible to remove the air between the hot laminate and the mold, allowing atmospheric pressure to force the hot laminate against the mold. Also, the laminate may be draped manually to the reguired contour of a female mold, such as to make a seal possible. Positive air pressure may also be applied against the top of the laminate to force it into a female mold as an alternative to vacuum forming.

To promote uniformity of distribution in cookware of particular shapes such as a box shape, a plug assist may be used. This may be any type of mechanical helper which carries extra material toward an area which would otherwise be too thin. Usually the plug is made of metal, and heated to a temperature slightly below that of the hot plastic, so as not to cool the laminate before it can reach its final shape. Instead of metal, a smooth grained wood can be used or a thermoset plastic, such as phenolic or epoxy. These materials are poor conductors of heat and hence do not withdraw much heat from the sheet. Plug assists are adaptable both to vacuum forming and pressure forming technigues.

Another method which can be used to thermoform the laminate is matched mold forming. In this method, the laminate is locked into a clamping frame and heated to the proper forming temperature. A male mold is positioned on the top or bottom platen with a matched female mold mounted on the other platen. The mold is then closed, forcing the laminate to the contours of both molds. The clearance between the male and female molds determines the wall thickness. Trapped air is allowed to escape through both mold faces. Molds are held in place until the laminate cools.

In a preferred embodiment, the laminate is locked into a frame around its periphery only. The laminate is then heated in an oven to a temperature above the glass transition of the polymer(s) in the laminate, which is generally between about 530° and about 600° F. The laminate is heated at this temperature for about 15 to about 20 seconds so that the laminate sags under its own weight. The laminate is then brought into contact with the edge of a female mold so as to create a seal between the hot plastic and the mold. The female mold is positioned in the top platen. A vacuum is then started so that the laminate is pulled into the confines of the female mold. The mold temperature is generally of less than or egual to 275° F., preferably less than 270° F., and more preferably between about 180° F. and 240° F. The PET is guenched rapidly enough to maintain this material in an amorphous state. Under these conditions, low temperature drop strength is maximized because of the amorphous nature of the entire laminate. In cooking at temperatures above about 350° F., the PET tends to crystallize, especially in areas not protected by the heat sink effect of the food. This advance in crystallinity thereby provides improved flexural modulus in those areas to provide reduced deflection of the tray during handling and removal from the oven. It is particularly noted that the tray handle and/or upper rim area are expected to become at least partially crystallized during conventional oven use, and the resulting improved flexural modulus is expected to facilitate handling of the tray. It is further noted that the food in the frozen food tray/cookware is expected to act as a heat sink, thereby retarding the crystallization of the tray portions covered by food. The material is allowed to remain in the mold for generally between about 5 and 60 seconds, preferably for about 30 seconds so that it cools from its initial temperature of between 530° and 600° F. to the mold temperature which is from about 180° F. to about 240° F. The formed laminate at this point is rigid and can be removed from the mold. The preferred molding procedure results in a better distribution of thickness of material in the molded article. Also, the molded articles is generally free of pin holes when this procedure, is used. In a variation of the preferred procedure, the laminate is forced into the female mold with a plug assist. The plug is so positioned that it carries the laminate into the female mold but does not touch any part of the mold. The vacuum is then turned on so that the laminate forms to the contours of the female mold. The formed laminate is allowed to cool as described above and then removed from the mold.

COOKWARE

The cookware of this invention may be any type of container or tray which is used to heat or cook food. The cookware may be of any shape or design with dimensions dependent upon the desired end use. Representative cookware is found in, for example, U.S. Pat. Nos. 3,938,730; 3,743,077 and 3,955,170. Also, representative designs of cookware are described in, for example, U.S. Pat. Nos. Des. 236,574; 194,277 and 236,182. The cookware may be used to heat and bake all types of food, including frozen food in a coventional or microwave oven.

EXAMPLES

The following examples serve to give specific illustrations of the practice of this invention but they are not intended in any way to limit the scope of this invention.

The following designations used in the Examples have the following meaning:

Polyarylethersulfone: A polymer having the following repeating unit:

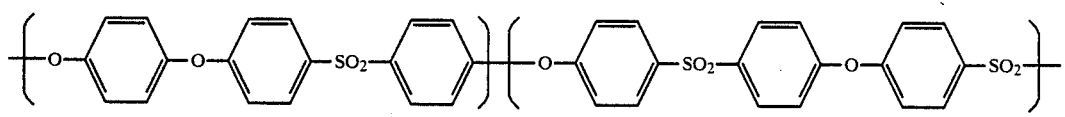

The polymer has a reduced viscosity of 0.61 dl/g as measured in N-methyl-pyrrolidinone (0.2 g/100 ml) at 25° C.

Polyethylene terephthalate (PET): Vituf 1001A obtained from Goodyear Chemicals. This polymer has an intrinsic viscosity of 1.04 dl/g. as measured in 60/40 phenol/tetrachloroethane at 25° C.

PREPARATION OF POLYARYLETHERSULFONE

A four neck 1000 ml round-bottom flask was eguipped with a mechanical stirrer, thermometer, addition funnel, dry nitrogen inlet, and vacuum jacketed vigreux column with Dean Stark trap and condenser. Into the flask were charged 143.58 g (0.50 moles) of 4,4'-dichlorodiphenyl sulfone, 62.58 g (0.25 moles) of 4,4'-dihydroxydiphenyl sulfone, 27.56 g (0.25 moles) of hydroguinone, 76.02 g (0.55 moles) of potassium carbonate, 100 ml of toluene and 466 ml of sulfolane. The mixture was purged with nitrogen for 1 hour at room temperature (about 25° C.) and then heated to reflux (141° C.). After 1 hour at reflux, the temperature of the reaction was increased to about 200° C. by slowly removing the toluene. After about 5 hours at 200° C., the reaction was terminated by adding methyl chloride. The polymer so produced was recovered by coagulation in water followed by washing the polymer several times with hot water (80° C.).

The polyarylethersulfone product had a reduced viscosity of 0.61 dl/g as measured in N-methyl-pyrrolidinone (0.2 g/100 ml) at 25° C. The polymer was made up of the following repeating unit:

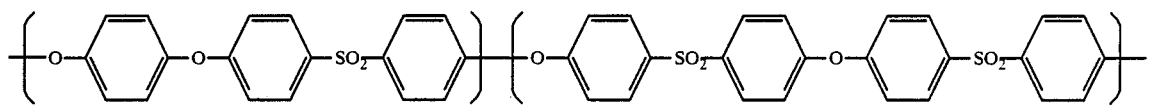

PREPARATION OF LAMINATES; CONTROLS AND EXAMPLE

A polyethylene terephthalate composition was dried at 300° F. for about 6 hours. This composition was then fed into a 1½ inch 24:1 (L:D) Sterling extruder. At the same time Polyarylethersulfone was fed into a 1 inch diameter 24:1 (L:D) Egan satellite extruder. Both of these feed materials were fed through a flow selector housing and then into a variable-vane multi-manifold 13-½ inch width Cloeren die. The flow-selector was configured to provide a 24 mil co extruded laminate exiting the die. The laminate was fabricated to have a mil thickness configuration of polyarylethersulfone/-PET/polyarylethersulfone of either 2.6/18.8/2.6 or 4.8/14.4/4.8 based upon the total 24 mil laminate thickness. The resulting laminates were visually transparent.

GENERAL PROCEDURE OF FABRICATION OF COOKWARE FROM LAMINATES

The laminates made above were thermoformed into cookware which was a tray 8¼ inches long, 5½ inches wide and 1 inch deep. The laminate was first placed into a frame and clamped. The frame was placed between two heaters set at about 1200° F. and held there for about 25 seconds until the laminate began to "sag" under its own weight. The temperature of the laminate at this point was between 530° and 600° F. The laminate was then placed into contact with a female mold which was in the bottom platen of a press. The female mold was raised into contact with the laminate so as to form a tight seal with the laminate. A vacuum was started and the laminate contacted the female mold. The mold temperature was set at 200° F., 275° F., 285° F. or 380° F., as noted in Table I below. The laminate was in contact with the female mold for about 30 seconds. The mold was retracted and the tray thus formed was released. Total cycle time was about 90 seconds. The tray was then trimmed. The average gauge thickness of the tray was 24 mils.

Each tray was filled with 12 ounces of Dinty Moore Beef Stew in such a way that the food surface was relatively flat and level. The trays were covered with aluminum foil. The protruding edges of foil were tucked tightly under the tray lip, making sure that the sides of the tray were visible and not obstructed with aluminum.

The trays were kept in the freezer section of a household refrigerator and maintained in a frozen state until being subjected to the following test regimen.

The trays were subjected to a drop test procedure and a cooking test procedure as described hereinbelow. Additionally, the percent crystallinity was calculated as described below.

EXAMPLE I

DROP TEST PROCEDURE

The samples were taken from the freezer and placed into a cold box and maintained at −40° F. for at least twenty-four hours.

A group of six like samples was removed to the testing area. The first sample was dropped from a height of four feet onto a concrete floor non-resilient surface. If it passed the test, this was recorded and the next sample was dropped from five feet; if the first fails at four feet, the second was dropped from three feet. In like manner, all six samples were dropped; for each one the drop height and success or failure were recorded. The success or failure of one sample raised or lowered by one foot the height from which the next sample was dropped. This is commonly called the stair-step method of impact.

The trays were stood on end and dropped to land sguarely on the short end, bottom perpendicular to the floor to provide consistent tray orientation at impact following a free-fall path free of obstruction. The tray was dropped between spaced guides whose separation was less than the tray width. The drop height of the tray was measured from the bottom lip of the tray when stood on end.

The dropped sample was examined for damage. Failure is defined as the cracking of the tray at any point. The foil was then removed and the tray was examined along the lip and the sides. If the lip has been bent inward by the impact but no cracks are present, the tray was considered to pass the test.

The dropped trays were emptied, labelled according to trial, and retained.

It should be noted that the stair-step method of impact utilized reguired that 50% of the samples tested pass the test at the drop height values given in Table I.

In addition to the impact strength measurement based upon the drop test described above, Table I presents percent haze and percent crystallinity values for trays made from the laminates as identified in Table I. To make these measurements, a calibration curve for a control sample was first established. This control sample was a coextrusion of PES/PET/PES at 21 mils total thickness having proportions of 20/60/20 percent, respectively, of the layers. This sample was transparent and, therefore, amorphous in PET. A second sample of this construction was then annealed for 3 hours at 350° F., more than sufficient to fully crystallize the PET. The density of each these control samples was then measured using the ASTM-D-1505 procedure and percent haze was measured using the ASTM-D-1003 procedure. These results are shown below:

| | Density (ASTM-D-1505) | Percent Haze (ASTM-D-1003) |
|---|---|---|
| Control (Amorphous PET) | 1.355 gm/cc | 3.9 |
| Control (Crystallized PET) | 1.382 gm/cc | 101.3 |

One may calculate α, the fraction of PET crystallized, by the following equation:

$$\alpha = \frac{\rho - 1.356}{1.430 - 1.356}$$

where:
α = fraction PET Crystallized
β = Density of sample studied
1.356 = Density of 40/60 PES/PET with PET amorphous
1.430 = Density of 40/60 PES/PET with PET crystallized 100%
Percent crystallinity of the PET is then 100 α.

Using these calculations, the following table can be constructed:

| | Density | % Haze | % Crystallinity of PET |
|---|---|---|---|
| Control (Amorphous PET) | 1.355 gm/cc | 3.9 | −1.35 = 0* |
| Control (Crystallized PET) | 1.382 gm/cc | 101.3 | 35.1 |

*Taken as zero since cannot have negative crystallinity. Approximation is certainly valid within experimental error.

Percent haze was converted into percent crystallinity using the following equation:

$$y = 2.77x + 3.9$$

where:
y = Percent Haze
x = Percent Crystallinity $$\text{or } x = \frac{y - 3.9}{2.77}$$

Thus, for any haze measurement reading, the percent crystallinity of the contained PET may be calculated. The percent crystallinity and low temperature impact strength values are given in Table I which follows:

TABLE I

Physical Properties of Trays Fabricated at Various Mold Temperatures

| Tray | PES/PET/PES Layers, mils | Mold Temp. °F. | % Haze | PET Layer % Crystallinity | Low Temp. Impact Str. 50% Non-Failure, Ft. |
|---|---|---|---|---|---|
| A | 2.6/18.8/2.6 | 200 | 3.8 | 0 | >6½ |
| B | 4.8/14.4/4.8 | 200 | 3.9 | 0 | 7 |
| C | 2.6/18.8/2.6 | 275 | 12.8 | 3.2 | >6 |
| D | 2.6/18.8/2.6 | 285 | 68.8 | 23.4 | 4½ |
| E | 4.8/14.4/4.8 | 300 | 76.5 | 26.2 | 3½ |
| F | 2.6/18.8/2.6 | 380 | 105.3 | 36.6 | 2½ |

The crystallinity data given in Table I indicates that at mold temperatures above 275° F., the percent crystallinity changes rapidly over a short span of mold temperature differences. Note that Tray C, fabricated at a mold temperature of 275° F., has a percent crystallinity of the PET layer of 3.2%, whereas Tray D, fabricated at a mold temperature of 285° F., has a percent crystallinity of the PET layer of 23.4%. This would indicate that minor differences in mold temperature control and/or differences in dwell time on the mold at a mold temperature around 275° F. could cause large changes in the percent crystallinity of the PET. This is undesirable since, as is readily apparent from the last column of Table I, low temperature impact strength drops as crystallinity increases. Compare Tray C with Tray D and note the drop-off in impact strength (6 feet versus 4½ feet) as measured in terms of tray drop height having 50% non failure of trays.

In summary, the crystallinity data presented in Table I shows the desirability of keeping the mold temperature below about 275° F., preferably below about 270° F. to insure that the PET is kept in an essentially amorphous state of below about 5% crystallinity.

EXAMPLE II

COOKING TEST PROCEDURE

A G.E. model T26 toaster oven is used for this test. The oven is equipped with two thermocouples attached to an LED readout; one is used to monitor food temperature; the other head enters through the back of the oven and is suspended within it, to monitor oven temperature. This latter probe is to be kept about one inch above the top of the stew during cooking.

The stew is cooked until its temperature reaches 170° F.

The sample is removed from the oven and immediately hand-tested for stiffness and memory. To do this, one picks up the tray in the following manner: holding the tray by the lip that was in the back of the oven (where temperatures are higher), the tray is picked up with one hand so that the thumb supports the side, if the side caves in this is noted. The tray is then set down and it is noted whether it returns to shape completely.

Other conditions worth noting include rippling and bubbling, as well as waviness in the configuration of the tray after the cooking test.

The results of this cooking test is presented in Table II and Table III which follows:

TABLE II

COOKING TEST AT AN OVEN TEMPERATURE SETTING OF 400° F.

| TRAY | CYCLE TIME | END-OF-CYCLE OVEN TEMP. | VISUAL APPEARANCE |
|---|---|---|---|
| A | 36' | 307.4–321.8° F. | rippled in the sides; tray seems soft at base but returns to shape; tray crystallized along upper half. |
| B | 45' | 293–311° F. | excellent; tray crystallized along upper half and faintly in bottom in spots. |
| C | 34'50" | 307.4–325.4° F. | slightly rippled: tray crystallized along upper half. |
| D | 36' | 300.2–320° F. | excellent |
| E | 44'30" | 300–323.6° F. | excellent. |
| F | 37' | 291.2–303.8° F. | excellent. |

TABLE III

COOKING TEST AT AN OVEN TEMPERATURE SETTING OF 450° F.

| TRAY | CYCLE TIME | END-OF-CYCLE OVEN TEMP. | VISUAL APPEARANCE |
|---|---|---|---|
| A | 29'40" | 339.8–363.2° F. | rippled in the sides; tray crystallized along upper half. |
| B | 29' | 343.4–359.6° F. | slightly wavy in the sides; otherwise excellent; tray crystallized along upper half. |
| C | 28'20" | 359.6–381.° F. | slightly rippled; tray flexes easily but returns to shape. |
| D | 28'30" | 347–368.6° F. | tray crystallized along upper half. distorted in one side; tray further crystallized along upper half. |
| E | 34' | 330.8–345.2° F. | excellent; stiff. |
| F | 33'30" | 341.6–361.4° F. | slightly distorted in the sides; otherwise excellent. |

The data presented in Tables II and III indicates that the visual appearance of all trays tested was at least adequate at oven temperature settings of 400° F. (Table II) and 450° F. (Table III). An analysis of this data in light of the data presented in Table I above indicates that a combination of enhanced low temperature impact strength and adequate conventional ovenability is achieved by maintaining the innermost PET layer in an essentaily amphorous state of below about 5% crystallinity during fabrication of the tray. This is achieved by maintaining the mold temperature during fabrication below about 275° F.

Visual examination of trays retained from previous cooking experiments and an assessment of the haze developed, compared to the examples shown here, show that the portions of the trays unprotected by the heat sink effect of food in the tray, e.g., the tray rim, have advanced to approximately 35% or greater crystallinity. This provides improved flexural modulus in those areas to provide reduced deflection of the tray during handling and removal of the food laden tray from the oven. It is not possible to optically measure the haze level of the tray rims since these areas of the tray are curved and not suitable for such instrumental measurements.

What is claimed is:

1. Frozen food tray/cookware made from a laminate said laminate comprising at least three sheets made from a thermoplastic resin, including an inside sheet and at least two outside sheets, said outside sheets being made from a thermoplastic resin selected from the group consisting of a polyarylethersulfone, a poly(aryl ether), polyarylate, polyetherimide, polyester, aromatic polycarbonate, styrene resin, poly(alkyl acrylate), polyhydroxyether, polyamide, and poly(arylene sulfide), said inside sheet being made from an amorphous thermoplastic resin having a lower use temperature than the outside sheets, said amorphous thermoplastic resin is crystallized no more than about 5% at said lower use temperature.

2. Frozen food tray/cookware as defined in claim 1 wherein the inside sheet is made from a polyester thermoplastic resin.

3. Frozen food tray/cookware as defined in claim 2 wherein the polyester thermoplastic resin is selected from the group consisting of poly(ethylene terephthalate) and poly(butylene terephthalate).

4. Frozen food tray/cookware as defined in claim 1 wherein the outside layers comprise a polyarylethersulfone thermoplastic resin.

5. Frozen food tray/cookware as defined in claim 4 wherein the polyarylethersulfone contains units of the following formula:

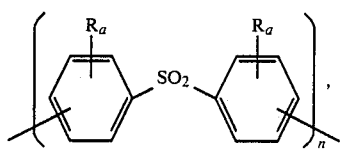

and

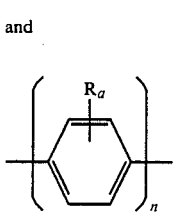

and/or

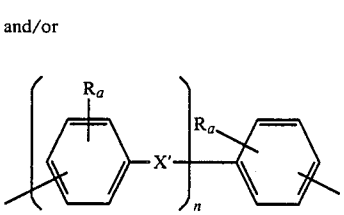

wherein R is independently hydrogen, $C_1$ to $C_6$ alkyl or $C_4$ to $C_8$ cycloalkyl, X' is independently

wherein $R_1$ and $R_2$ are independently hydrogen or $C_1$ to $C_9$ alkyl, or

wherein $R_3$ and $R_4$ are independently hydrogen or $C_1$ to $C_8$ alkyl, and $a_1$ is an integer of 3 to 8; —S—, —O—, or

a is an integer of 0 to 4 and n is independently an integer of 1 to 3 and wherein the ratio of unit (I) to the sum of units (II) and/or (III) is greater than 1, wherein the units are attached to each other by an —O— bond.

6. Cookware as defined in claim 4 wherein in the polyarylethersulfone, unit (I) has the formula:

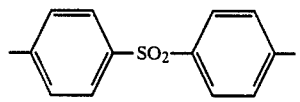

7. Cookware as defined in claim 4, wherein in the polyarylethersulfone, unit (II) has the formula:

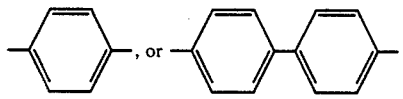

8. Cookware as defined in claim 4, wherein in the polyarylethersulfone, unit (III) has the formula:

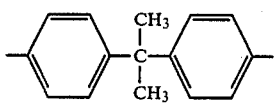

9. Cookware as defined in claim 4, wherein the polyarylethersulfone contains recurring units of the formula:

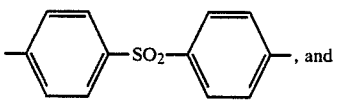

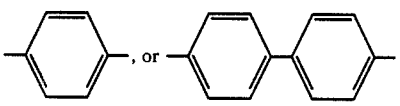

said units being attached to each other or by an —O— bond.

10. Cookware as defined in claim 1, wherein the polyarylethersulfone contains recurring units of the formula:

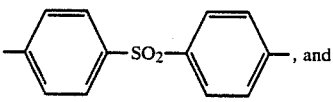 (I)

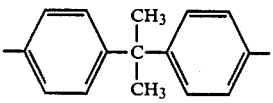 (II)

11. Cookware as defined in claim 1 wherein the poly(aryl ether) contains recurring units of the following formula:

—O—E—O—E'— wherein E is the residuum of a dihydric phenol, and E' is the residuum of a benzenoid compound having an inert electron withdrawing group in at least one of the positions ortho and para to the valence bonds; both of said residua are valently bonded to the ether oxygens through aromatic carbon atoms.

12. Cookware as defined in claim 11 wherein the poly(aryl ether) has repeating units of the formula:

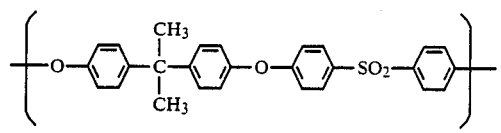

13. Cookware as defined in claim 11 wherein the poly(aryl ether) has repeating units of the formula:

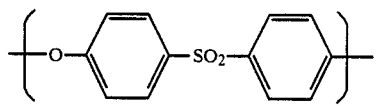

14. Cookware as defined in claim 11 wherein the poly(aryl ether) contains units of the following formula:

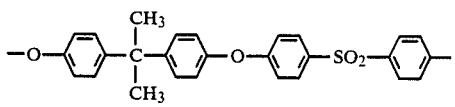

15. Cookware as defined in claim 1 wherein the thermoplastic polymer is a polyarylate.

16. Cookware as defined in claim 15 wherein the polyarylate is derived from a dihydric phenol and at least one aromatic dicarboxylic acid.

17. Cookware as defined in claim 16 wherein the dihydric phenol is of the following formula:

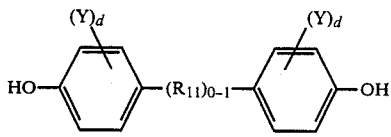

wherein Y is independently selected from, hydrogen, alkyl groups of 1 to 4 carbon atoms, chlorine or bromine, each d, independently, has a value of from 0 to 4, inclusive, and $R_{11}$ is a divalent saturated or unsaturated aliphatic hydrocarbon radical, particularly an alkylene or alkylidene radical having from 1 to 6 carbon atoms, or a cycloalkylidene or cycloalkylene radical having up to and including 9 carbon atoms, O, CO, $SO_2$, or S.

18. Cookware as defined in claim 16 wherein the aromatic dicarboxylic acid is terephthalic acid, isophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents, such as halides, alkyl or aryl ethers.

19. Cookware as defined in any of claims 15 through 18 wherein the polyarylate is derived from bisphenol A and terephthalic acid or isophthalic acid, or mixtures thereof.

20. Cookware as defined in claim 1 wherein the thermoplastic polymer is a polyetherimide.

21. Cookware as defined in claim 20 wherein the polyetherimide polymer is of the following formula:

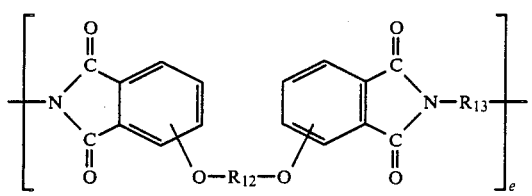

wherein e is an integer greater than 1, preferably from about 10 to about 10,000 or more, —O—R$_{12}$—O— is attached to the 3 or 4 and 3' or 4' positions and R$_{12}$ is selected from the group consisting of (a) a substituted or unsubstituted aromatic radical

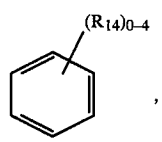, or

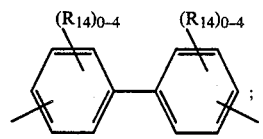;

and (b) a divalent radical of the formula:

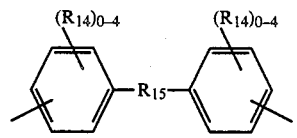

wherein R$_{14}$ is independently C$_1$ to C$_6$ alkyl, aryl or halogen and R$_{15}$ is selected from —O—, —S—,

—SO$_2$—, —SO—, alkylene of 1 to 6 carbon atoms, cycloalkylene of 4 to 8 carbon atoms, alkylidene of 1 to 6 carbon atoms or cycloalkylidene of 4 to 8 carbon atoms, R$_{13}$ is selected from an aromatic hydrocarbon radical having from 6 to 20 carbon atoms and halogenated derivatives thereof, or alkyl substituted derivatives thereof, wherein the alkyl group contains 1 to 6 carbon atoms, alkylene and cycloalkylene radicals having from 2 to 20 carbon atoms and C$_2$ to C$_8$ alkylene terminated polydiorganosiloxane or a divalent radical of the formula

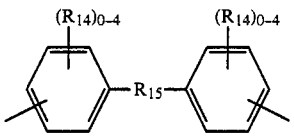

wherein R$_{14}$ and R$_{15}$ are as previously defined.

22. Cookware as defined in claim 20 wherein the polyetherimide has repeating units of the following formula:

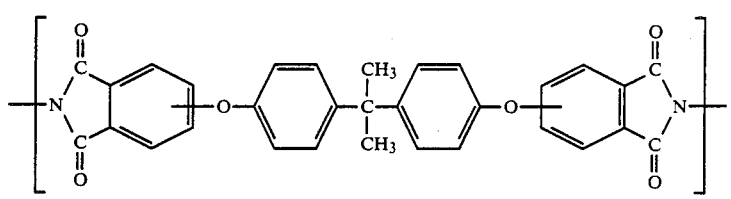

23. Cookware as defined in claim 1 wherein the thermoplastic polymer is a polyester.

24. Cookware as defined in claim 23 wherein the polyester has repeating units of the general formula:

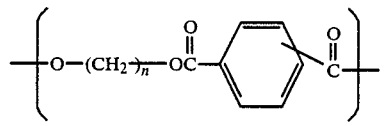

wherein n is an integer of from 2 to 10.

25. Cookware as defined in claims 2 or 23 wherein the polyester is poly(ethylene terephthalate), poly(butylene terephthalate), or a mixture thereof.

26. Cookware as defined in claim 1 wherein the thermoplastic polymer is an aromatic polycarbonate.

27. Cookware as defined in claim 26 wherein the aromatic polycarbonate is the reaction product of a dihydric phenol and a carbonate precursor.

28. Cookware as defined in claim 27 wherein the dihydric phenol is bisphenol-A and the carbonate precursor is carbonyl chloride.

29. Cookware as defined in claim 26 wherein the polycarbonate is poly(ester carbonate).

30. Cookware as defined in claim 1 wherein the thermoplastic polymer is a styrene polymer.

31. Cookware as defined in claim 30 wherein the styrene polymer is prepared by polymerizing a conjugated diene monomer, or a conjugated diene monomer and monomer copolymerizable therewith, or an acrylic acid ester, to provide an elastomeric backbone, and thereafter grafting at least one grafting monomer onto said backbone.

32. Cookware as defined in claim 31 wherein the conjugated diene monomer is butadiene and the grafting monomer is selected from styrene, an acrylonitrile, an acrylic acid ester, or mixtures thereof.

33. Cookware as defined in claim 30 wherein the styrene resin is a butadiene/styrene/acrylonitrile resin.

34. Cookware as defined in claim 1 wherein the thermoplastic polymer is a poly(alkyl acrylate) polymer.

35. Cookware as defined in claim 34 wherein the poly(alkyl acrylate) is poly(methyl methacrylate).

36. Cookware as defined as in claim 35 wherein the poly(alkyl acrylate) is a copolymer of methyl methacrylate and a vinyl monomer wherein the amount of methyl methacrylate is greater than about 70 percent of weight of the copolymer.

37. Cookware as defined in claim 36 wherein the vinyl monomer is selected from acrylonitrile, N-allylmaleimide, vinyl chloride, N-vinylmaleimide or an alkyl acrylate or methacrylate, wherein the alkyl group contains from 1 to 8 carbon atoms.

38. Cookware as defined in claim 1 wherein the thermoplastic polymer is a polyhydroxyether.

39. Cookware as defined in claim 38 wherein the polyhydroxyether has the following general formula:

$$-F-O-F'-O_j$$

where F is the radical, residuum of a dihydric phenol, F' is a radical residuum of an epoxide selected from mono- and diepoxides and which contain from 1 to 2 hydroxyl groups, and j is an integer which represents the degree of polymerization and is at least about 30.

40. Cookware as defined in claim 1 wherein the thermoplastic polymer is a polyamide.

41. Cookware as defined in claim 40 wherein the polyamide is selected from nylon 6,6, nylon 6, or nylon 6,10.

42. Cookware as defined in claim 1 wherein the thermoplastic polymer is poly(arylene sulfide).

43. Cookware as defined in claim 42 wherein the poly(arylene sulfide) is of the following formula:

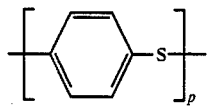

wherein p has a value of at least about 50.

44. A laminate comprising at least three sheets made from at least one thermoplastic resin, including at least two outside sheets made from a thermoplastic resin selected from the group consisting of a polyarylethersulfone, a poly(aryl ether), polyarylate, polyetherimide, polyester, aromatic polycarbonate, styrene resin, poly(aryl acrylate), polyhydroxylether, poly(arylene sulfide) and polyamide, and an inside sheet made from an amorphous thermoplastic resin having a lower use temperature than the outside sheets, said amorphous thermoplastic resin being at least partially crystallizable at said lower use temperature.

45. A laminate as defined in claim 44 wherein said amorphous thermoplastic resin is a polyester.

46. A laminate as defined in claim 45 wherein said polyester is selected from the group consisting of polyethylene terephthalate and polybutylene terephthalate.

47. A laminate as defined in claim 44 wherein at least one of said outside sheets comprises a polyarylethersulfone.

48. Frozen food tray/cookware as defined in claim 1 wherein the inside sheet is made from a polyamide thermoplastic resin.

49. Frozen food tray/cookware as defined in claim 1 wherein the inside sheet is made from a poly(arylene sulfide) thermoplastic resin.

50. A laminate as defined in claim 44 wherein said amorphous thermoplastic resin is a polyamide.

51. A laminate as defined in claim 44 wherein said amorphous thermoplastic resin is a poly(arylene sulfide).

52. The frozen food tray/cookware of claim 1 fabricated by molding said laminate at a mold temperature below about 275° F.

53. The frozen food tray/cookware of claim 1 fabricated by molding said laminate at a mold temperature below about 270° F.

54. The frozen food tray/cookware of claim 1 fabricated by molding said laminate at a mold temperature between about 180° F. and about 240° F.

55. Cookware as defined in claim 20 wherein the polyetherimide is of the following formula:

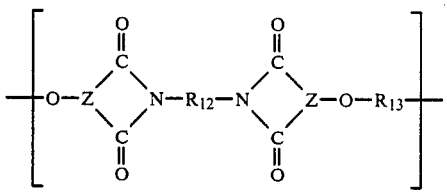

wherein —O—Z is a member selected from

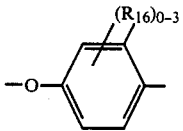

wherein $R_{16}$ is independently hydrogen, lower alkyl or lower alkoxy

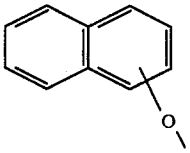

and

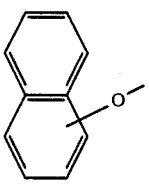

wherein the oxygen may be attached to either ring and located ortho or para to one of the bonds of the imide carbonyl groups, $R_{12}$ and $R_{13}$ and e are as defined in claim 21.

* * * * *